US011843586B2

(12) United States Patent
Gharibi et al.

(10) Patent No.: US 11,843,586 B2
(45) Date of Patent: *Dec. 12, 2023

(54) SYSTEMS AND METHODS FOR PROVIDING A MODIFIED LOSS FUNCTION IN FEDERATED-SPLIT LEARNING

(71) Applicant: TripleBlind, Inc., Kansas City, MO (US)

(72) Inventors: Gharib Gharibi, Lenexa, KS (US); Ravi Patel, Kansas City, MO (US); Babak Poorebrahim Gilkalaye, Kansas City (CA); Praneeth Vepakomma, Weymouth, MA (US); Greg Storm, Parkville, MO (US); Riddhiman Das, Parkville, MO (US)

(73) Assignee: TRIPLEBLIND, INC., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/897,884

(22) Filed: Aug. 29, 2022

(65) Prior Publication Data

US 2022/0417225 A1    Dec. 29, 2022

Related U.S. Application Data

(63) Continuation of application No. 17/499,153, filed on Oct. 12, 2021, now Pat. No. 11,431,688, which is a
(Continued)

(51) Int. Cl.
*H04L 9/40* (2022.01)
*G06F 17/16* (2006.01)
(Continued)

(52) U.S. Cl.
CPC .......... *H04L 63/0428* (2013.01); *G06F 17/16* (2013.01); *G06F 18/2113* (2023.01);
(Continued)

(58) Field of Classification Search
CPC ... H04L 63/0428; H04L 9/008; H04L 9/0625; H04L 2209/46; G06F 17/16;
(Continued)

(56) References Cited

U.S. PATENT DOCUMENTS

| 1,045,208 A | 11/1912 | Spencer |
| 5,410,696 A | 4/1995 | Seki et al. |
(Continued)

FOREIGN PATENT DOCUMENTS

| WO | WO 2021/119365 | 6/2021 |
| WO | WO 2021/119367 | 6/2021 |

OTHER PUBLICATIONS

Brisimi et al. "Federated learning of predictive models from federated electronic health records", International Journal of Medical Informatics, Apr. 2018, retrieved on Jan. 18, 2021 from http://www.ncbi.nlm.nih/gov/pmc/articles/PMC5836813/pdf/nihms936798.pdf.
(Continued)

*Primary Examiner* — Moeen Khan

(57) ABSTRACT

Disclosed is a method that includes training, at a client, a part of a deep learning network up to a split layer of the client. Based on an output of the split layer, the method includes completing, at a server, training of the deep learning network by forward propagating the output received at a split layer of the server to a last layer of the server. The server calculates a weighted loss function for the client at the last layer and stores the calculated loss function. After each respective client of a plurality of clients has a respective loss function stored, the server averages the plurality of respective weighted client loss functions and back propagates gradients based on the average loss value from the last layer of the server to the split layer of the server and transmits just the server split layer gradients to the respective clients.

20 Claims, 14 Drawing Sheets

Related U.S. Application Data continuation of application No. 17/499,153, filed on Oct. 12, 2021, now Pat. No. 11,431,688, which is a continuation-in-part of application No. 16/828,085, filed on Mar. 24, 2020, now Pat. No. 11,582,203, which is a continuation of application No. 17/499,153, filed on Oct. 12, 2021, now Pat. No. 11,431,688, which is a continuation-in-part of application No. 16/828,216, filed on Mar. 24, 2020, which is a continuation of application No. 17/499,153, filed on Oct. 12, 2021, now Pat. No. 11,431,688, which is a continuation-in-part of application No. 17/176,530, filed on Feb. 16, 2021, which is a continuation of application No. 16/828,354, filed on Mar. 24, 2020, now Pat. No. 10,924,460, which is a continuation of application No. 17/499,153, filed on Oct. 12, 2021, now Pat. No. 11,431,688, which is a continuation-in-part of application No. 16/828,420, filed on Mar. 24, 2020, now Pat. No. 11,363,002, which is a continuation of application No. 17/499,153, filed on Oct. 12, 2021, now Pat. No. 11,431,688.

(60) Provisional application No. 63/090,904, filed on Oct. 13, 2020, provisional application No. 62/948,105, filed on Dec. 13, 2019, provisional application No. 63/226,135, filed on Jul. 27, 2021.

(51) Int. Cl.
| | | |
|---|---|---|
| *H04L 9/00* | (2022.01) | |
| *H04L 9/06* | (2006.01) | |
| *G06N 3/04* | (2023.01) | |
| *G06N 3/082* | (2023.01) | |
| *G06Q 20/40* | (2012.01) | |
| *G06Q 30/0601* | (2023.01) | |
| *G06F 18/24* | (2023.01) | |
| *G06F 18/2113* | (2023.01) | |

(52) U.S. Cl.
CPC .............. *G06F 18/24* (2023.01); *G06N 3/04* (2013.01); *G06N 3/082* (2013.01); *G06Q 20/401* (2013.01); *G06Q 30/0623* (2013.01); *H04L 9/008* (2013.01); *H04L 9/0625* (2013.01); *G06Q 2220/00* (2013.01); *H04L 2209/46* (2013.01)

(58) Field of Classification Search
CPC ........ G06K 9/623; G06K 9/6267; G06N 3/04; G06N 3/082; G06Q 20/401; G06Q 30/0623; G06Q 2220/00
USPC ......................................................... 706/25
See application file for complete search history.

(56) References Cited

U.S. PATENT DOCUMENTS

| | | | |
|---|---|---|---|
| 6,353,816 B1 | 3/2002 | Tsukimoto | |
| 6,668,325 B1 | 12/2003 | Collberg | |
| 9,464,043 B2 | 10/2016 | Roberge et al. | |
| 9,646,043 B1 | 5/2017 | Aronvich | |
| 10,002,029 B1 | 6/2018 | Bequet | |
| 10,311,372 B1 | 6/2019 | Hotchkies | |
| 10,360,220 B1 | 7/2019 | Gupta | |
| 10,362,001 B2 | 7/2019 | Yan | |
| 10,419,360 B2 | 9/2019 | Dawson | |
| 10,592,012 B2 | 1/2020 | Dawson | |
| 10,560,872 B2 | 2/2020 | Dawson | |
| 10,594,623 B2 | 3/2020 | Dawson | |
| 10,623,998 B2 | 4/2020 | Dawson | |
| 10,833,871 B2 | 11/2020 | Ranellucci | |
| 10,902,302 B2* | 1/2021 | Fu | G06V 10/82 |
| 10,924,460 B2 | 2/2021 | Storm | |
| 11,195,099 B2 | 12/2021 | Luo | |
| 11,316,676 B2 | 4/2022 | Kinjo | |
| 2003/0009482 A1 | 1/2003 | Benerjee | |
| 2006/0233377 A1 | 10/2006 | Chang | |
| 2007/0192864 A1 | 8/2007 | Bryant | |
| 2008/0082636 A1 | 4/2008 | Hofmann | |
| 2008/0201721 A1 | 8/2008 | Little | |
| 2009/0063485 A1 | 3/2009 | Schneider | |
| 2010/0100864 A1 | 4/2010 | Plants | |
| 2010/0281254 A1 | 11/2010 | Carro | |
| 2011/0161091 A1 | 6/2011 | Freishtat | |
| 2012/0047097 A1 | 2/2012 | Sengupta et al. | |
| 2013/0124491 A1 | 5/2013 | Pepper | |
| 2013/0272377 A1 | 10/2013 | Karczewicz | |
| 2014/0108813 A1 | 4/2014 | Pauker | |
| 2014/0371902 A1 | 12/2014 | McClelland | |
| 2015/0089243 A1 | 3/2015 | Veugen | |
| 2015/0156204 A1 | 6/2015 | Resch | |
| 2015/0242136 A1 | 8/2015 | Lin | |
| 2015/0288662 A1 | 10/2015 | Bilogrevic | |
| 2015/0371132 A1* | 12/2015 | Gemello | H01L 29/785 706/20 |
| 2016/0103901 A1 | 4/2016 | Kadav | |
| 2016/0156595 A1 | 6/2016 | Wu | |
| 2016/0205095 A1 | 7/2016 | Morel | |
| 2016/0294550 A1 | 10/2016 | French | |
| 2016/0335440 A1 | 11/2016 | Clark | |
| 2016/0342608 A1 | 11/2016 | Burshteyn | |
| 2017/0026342 A1 | 1/2017 | Sidana | |
| 2017/0116520 A1 | 4/2017 | Min | |
| 2017/0149796 A1 | 5/2017 | Gvili | |
| 2017/0228547 A1 | 8/2017 | Smith | |
| 2017/0323196 A1 | 11/2017 | Gibson | |
| 2017/0359321 A1 | 12/2017 | Rindal | |
| 2017/0372201 A1 | 12/2017 | Gupta | |
| 2018/0039884 A1 | 2/2018 | Dalton | |
| 2018/0041477 A1 | 2/2018 | Shaposhnik | |
| 2018/0330237 A1 | 2/2018 | Yoshiyama | |
| 2018/0129900 A1* | 5/2018 | Kiraly | G06N 3/08 |
| 2018/0157972 A1 | 6/2018 | Hu | |
| 2018/0205707 A1 | 7/2018 | Bellala | |
| 2018/0212770 A1 | 7/2018 | Costa | |
| 2018/0227296 A1 | 8/2018 | Joshi | |
| 2018/0367509 A1 | 12/2018 | O'Hare | |
| 2019/0005399 A1 | 1/2019 | Noguchi | |
| 2019/0050204 A1 | 2/2019 | Hutter | |
| 2019/0073580 A1 | 3/2019 | Dzhulgakov | |
| 2019/0073586 A1 | 3/2019 | Chen | |
| 2019/0073590 A1 | 3/2019 | Wu | |
| 2019/0114511 A1 | 4/2019 | Gao et al. | |
| 2019/0130265 A1 | 5/2019 | Ling | |
| 2019/0208417 A1 | 7/2019 | Kang | |
| 2019/0228299 A1 | 7/2019 | Chandran | |
| 2019/0286973 A1 | 9/2019 | Kovvuri | |
| 2019/0294805 A1 | 9/2019 | Taylor | |
| 2019/0312772 A1* | 10/2019 | Zhao | H04L 41/5051 |
| 2019/0318421 A1 | 10/2019 | Lyonnet | |
| 2019/0332944 A1 | 10/2019 | Bai | |
| 2019/0372760 A1 | 12/2019 | Zheng | |
| 2020/0036510 A1 | 1/2020 | Gomez | |
| 2020/0044862 A1 | 2/2020 | Yadlin | |
| 2020/0104670 A1 | 4/2020 | Seo | |
| 2020/0125933 A1 | 4/2020 | Aldea Lopez | |
| 2020/0158745 A1 | 5/2020 | Tian | |
| 2020/0167127 A1 | 5/2020 | Lokappa | |
| 2020/0167834 A1 | 5/2020 | Matsuoka | |
| 2020/0184044 A1 | 6/2020 | Zatloukal | |
| 2020/0186528 A1 | 6/2020 | Fan | |
| 2020/0193279 A1 | 6/2020 | Hostetler | |
| 2020/0202184 A1 | 6/2020 | Shrestha | |
| 2020/0226284 A1 | 7/2020 | Yin et al. | |
| 2020/0228313 A1 | 7/2020 | Storm | |
| 2020/0242492 A1 | 7/2020 | Goel | |
| 2020/0265301 A1* | 8/2020 | Burger | G06N 5/04 |
| 2020/0286145 A1 | 9/2020 | Storm | |
| 2020/0296128 A1 | 9/2020 | Wentz | |
| 2020/0304293 A1 | 9/2020 | Gama | |

(56) References Cited

U.S. PATENT DOCUMENTS

| | | |
|---|---|---|
| 2020/0322141 A1 | 10/2020 | Kinjo |
| 2020/0342288 A1 | 10/2020 | Xi |
| 2020/0342394 A1 | 10/2020 | Moore et al. |
| 2020/0358599 A1 | 11/2020 | Baracaldo Angel |
| 2020/0364608 A1 | 11/2020 | Anwar |
| 2020/0372360 A1* | 11/2020 | Vu .................. G06F 9/4843 |
| 2020/0387797 A1 | 12/2020 | Ryan et al. |
| 2020/0394316 A1 | 12/2020 | Boehler |
| 2020/0402625 A1 | 12/2020 | Aravamudan |
| 2021/0019605 A1 | 1/2021 | Rouhani |
| 2021/0026860 A1 | 1/2021 | Wang |
| 2021/0035330 A1 | 2/2021 | Xie |
| 2021/0064760 A1 | 3/2021 | Sharma |
| 2021/0073036 A1 | 3/2021 | Kim |
| 2021/0089878 A1 | 3/2021 | Greenwald |
| 2021/0117578 A1 | 4/2021 | Cheruvu |
| 2021/0142177 A1 | 5/2021 | Mallya |
| 2021/0150024 A1 | 5/2021 | Zhang |
| 2021/0157912 A1 | 5/2021 | Kruthiveti Subrahmanyeswara Sai |
| 2021/0192279 A1 | 6/2021 | Laaksonen et al. |
| 2021/0194668 A1 | 6/2021 | Masters |
| 2021/0209247 A1 | 7/2021 | Mohassel |
| 2021/0209514 A1 | 7/2021 | Kim et al. |
| 2021/0248268 A1 | 8/2021 | Ardhanari |
| 2021/0264271 A1 | 8/2021 | Gebre |
| 2021/0266170 A1 | 8/2021 | Rossi |
| 2021/0314140 A1 | 10/2021 | Stephenson |
| 2021/0334621 A1 | 10/2021 | Shimizu |
| 2021/0350357 A1 | 11/2021 | Lafontaine |
| 2021/0357859 A1 | 11/2021 | Malvankar |
| 2021/0374502 A1 | 12/2021 | Roth |
| 2021/0385069 A1 | 12/2021 | Reid |
| 2021/0406386 A1 | 12/2021 | Ortiz |
| 2021/0406406 A1 | 12/2021 | Hutter |
| 2022/0004654 A1 | 1/2022 | Patel |
| 2022/0012672 A1 | 1/2022 | Inman |
| 2022/0038271 A1 | 2/2022 | Ranellucci |
| 2022/0050921 A1 | 2/2022 | LaFever |
| 2022/0051276 A1 | 2/2022 | Zelocchi |
| 2022/0108026 A1 | 4/2022 | Ortiz |
| 2022/0121731 A1 | 4/2022 | Growth |
| 2022/0247548 A1 | 8/2022 | Boehler |
| 2022/0351039 A1 | 11/2022 | Satheesh Kumar |

OTHER PUBLICATIONS

Thapa et al., "SplitFed: When Federated Learning Meets Split Learning", Cornell University Library/Computer Science/Machine Learning, Apr. 25, 2020, [online] [retrieved on Dec. 15, 2021] Retrieved from the Internet URL:arXiv:2004.12088v, entire document.

Abedi, Ali, and Shehroz S. Khan. "FedSL: Federated Split Learning on Distributed Sequential Data in Recurrent Neural Networks", arXiv preprint arXiv:2011.03180 (Year 2021).

Nir Bitansky et al., "Post-quantum Zero Knowledge in Constant Rounds"; Jun. 2020; 48 pages (Year 2020).

Chandiramani, et al., "Performance Analysis and Distributed and Federated Learning Models on Private Data", Procedia Computer Science, 165(2019), pp. 349-355. (Year: 2019).

Lui et al., "Federated Forest", Arxiv.org, Cornell University Library, May 24, 2019, XP081662771, DOI: 10.1109/TBDATA.2020. 2992755, Sections 3, 4, 5; Figure 1. (Year: 2019).

* cited by examiner

SYSTEMS AND METHODS FOR PROVIDING A MODIFIED LOSS FUNCTION IN FEDERATED-SPLIT LEARNING

PRIORITY CLAIM

The present application is a continuation of U.S. patent application Ser. No. 17/499,153, filed Oct. 12, 2021, which is a non-provisional patent application of U.S. Provisional Application No. 63/090,904, filed on Oct. 13, 2020, which is incorporated herein by reference.

The present application is a continuation of U.S. patent application Ser. No. 17/499,153, filed Oct. 12, 2021, which is a continuation-in-part of U.S. patent application Ser. No. 16/828,085, filed Mar. 24, 2020, which claims the benefit of U.S. Provisional Application No. 62/948,105, filed Dec. 13, 2019, which is incorporated herein by reference.

The present application is a continuation of U.S. patent application Ser. No. 17/499,153, filed Oct. 12, 2021, which is a continuation-in-part of U.S. patent application Ser. No. 16/828,216, filed Mar. 24, 2020, which claims the benefit of U.S. Provisional Application No. 62/948,105, filed Dec. 13, 2019, which is incorporated herein by reference.

The present application is a continuation of U.S. patent application Ser. No. 17/499,153, filed Oct. 12, 2021, which is a continuation-in-part of U.S. patent application Ser. No. 17/176,530, filed Feb. 16, 2021, which is a continuation of U.S. patent application Ser. No. 16/828,354, filed Mar. 24, 2020, now U.S. Pat. No. 10,924,460, issued on Feb. 16, 2021, which claims the benefit of U.S. Provisional Application No. 62/948,105, filed Dec. 13, 2019, which is incorporated herein by reference.

The present application is a continuation of U.S. patent application Ser. No. 17/499,153, filed Oct. 12, 2021, which is a continuation-in-part of U.S. patent application Ser. No. 16/828,420, filed Mar. 24, 2020, which claims the benefit of U.S. Provisional Application No. 62/948,105, filed Dec. 13, 2019, which is incorporated herein by reference.

The present application is a continuation of U.S. patent application Ser. No. 17/499,153, filed Oct. 12, 2021, which is a non-provisional of U.S. Provisional Application No. 63/226,135, filed on Jul. 27, 2021, the contents of which are incorporated herein by reference.

TECHNICAL FIELD

The present disclosure generally relates to training neural networks and introduces new techniques for training and deploying neural networks or other trained models in ways which protect the training data from various sources from being discoverable and which involve a modified loss function used for further privacy. Another aspect of this disclosure involves a blind-learning approach to generating, by a model-averaging component, an average client-side model from a group of encrypted client-side models in which the averaging component cannot view or access the data of any of the respective client-side models as it performs its averaging operation.

BACKGROUND

There are existing approaches to training neural networks and the use of a federated training approach or a centralized training approach. Each of the existing approaches to training neural networks based on data from different clients involves data from respective clients that can leak or become discoverable. "Split learning" is a distributed deep learning technique for distributed entities (individual devices/organizations) to collaboratively train a deep learning model without sharing their sensitive raw data.

There are several variants of split learning for different settings/topologies of collaboration such as that of vertical partitioned distributed learning, learning without sharing labels, multi-hop split learning like TOR (named after Tor Syverson), learning with client weight synchronization and so forth. See Split learning for health: Distributed deep learning without sharing raw patient data, Vepakomma et al., $32^{nd}$ Conference on Neural Information Processing Systems, (NIPS 2018), Montreal, Canada. This document is incorporated herein by reference for background material. The TOR multi-hop split learning involves multiple clients training partial networks in sequence where each client trains up to a cut layer and transmits its outputs to the next client. The final client then sends its activations from its cut layer to a server to complete the training. There are improvements to these training models however than can further improve privacy of data and further prevent leaking.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

INTRODUCTION

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of examples of the application. However, it will be apparent that various examples may be practiced without these specific details. The figures and description are not intended to be restrictive.

The ensuing description provides examples only, and is not intended to limit the scope, applicability, or configuration of the disclosure. Rather, the ensuing description of the examples will provide those skilled in the art with an enabling description for implementing the concepts. It should be understood that various changes may be made in the function and arrangement of elements without departing from the spirit and scope of the application as set forth in the appended claims. It is also noted that any feature of an example can be combined or mixed with any other feature of any other example.

Figure 1A:
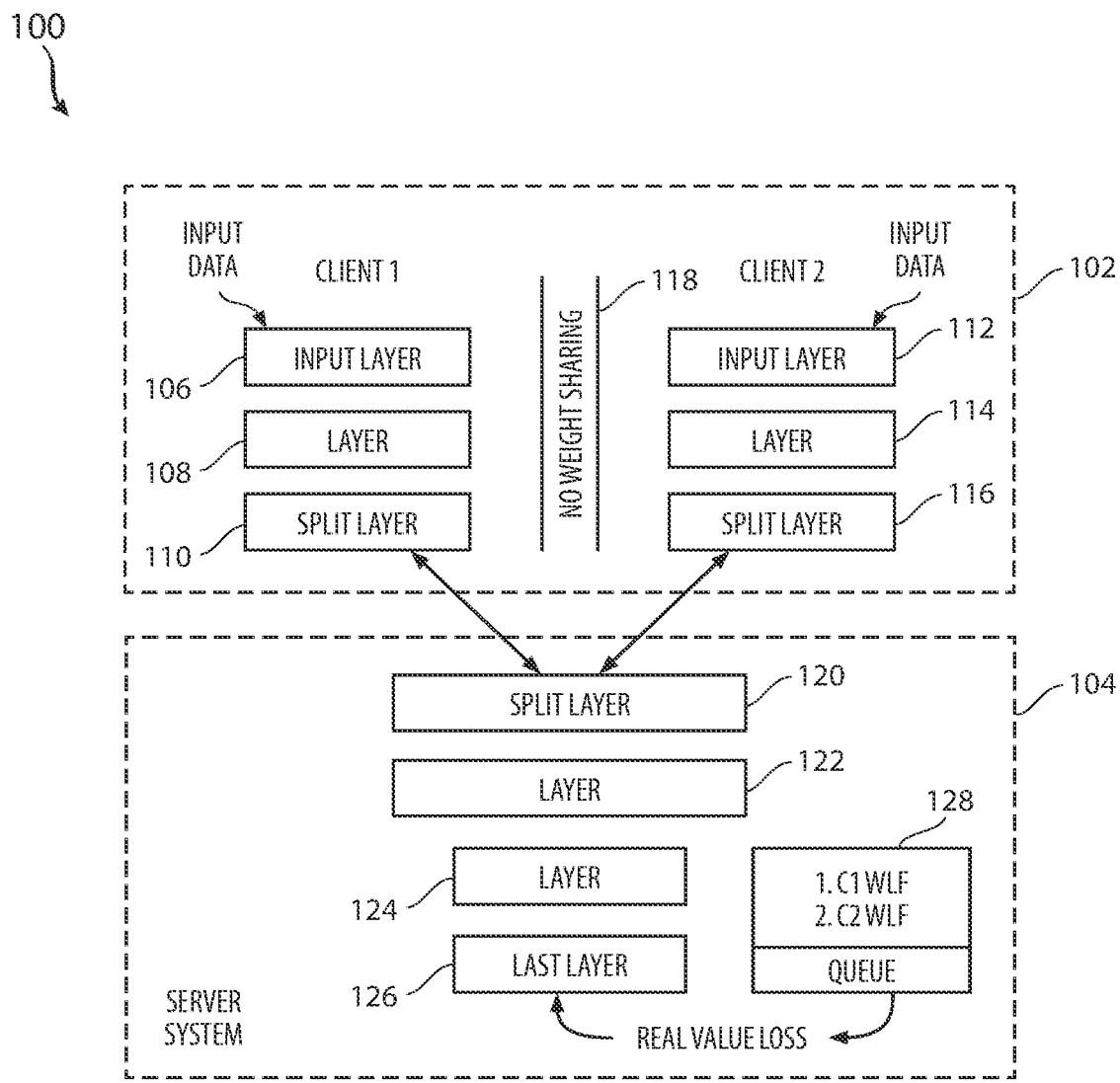
FIG. 1A illustrates an example training approach and deep learning structure.

One particular variant disclosed herein requires much less synchronization and is more resource efficient when training deep learning neural networks. This technique can be called federated-split learning or blind learning and is described in the patent applications incorporated herein by reference above. Described herein is a training process in the context of federated-split learning. The basic idea in any form of split learning is to split the total deep learning architecture that needs to be trained at one or more layers such that a respective client or node has only access to its share of layers before what are called split layer(s). The split layer to some degree defines the last layer of a respective client or node with the remaining layers of the architecture being configured on a different device, such as a server or generally on another node. The server only has access to the rest of the layers of the network after the split layer. The server's split layers are generally of a single copy, while the clients can have replicated copies (or can be different architectures) of their own layers before the split layer. Therefore the server layers are a shared resource up to an extent. FIG. 1A illustrates this approach and will be described in more detail below.

The approach disclosed below involves calculating an average loss value. The new approach differs from the prior systems which simply compute a loss gradient at a final layer of the server system and back propagates the loss function to refresh weights. In other words, there is no storing of loss functions in a queue and no averaging, at the server system, the plurality of respective weighted client loss functions to yield an average loss value. The disclosed solution addresses a problem rooted in how deep neural networks operate with respect to loss function propagation and proposes a solution that improves the functioning and operation of a neural network in a federated split-learning context.

An example method can include training, at a client system of a plurality of client systems, a part of a deep learning network up to a split layer of the client system. Based on an output of the split layer of the client system, the method can include completing, at a server system, training of the deep learning network by asynchronously forward propagating the output received at a split layer of the server system to a last layer of the server system. The server can calculate a weighted loss function for the client system at the last layer of the server system to yield a calculated loss function for the client system and store the calculated loss function for the client system in a queue.

The method can further include, after each respective client system of the plurality of client systems has a respective loss function stored in the queue to yield a plurality of respective weighted client loss functions, averaging, at the server system, the plurality of respective weighted client loss functions to yield an average loss value. The server back propagates gradients based on the average loss value from the last layer of the server system to the split layer of the server system to yield server system split layer gradients. The server then can transmit just the server system split layer gradients to the client system(s). In one aspect, no weights are shared across different client systems of the plurality of client systems. This is possible because of the averaging that is done at the server side across the plurality of respective weighted client loss functions.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DETAILED DESCRIPTION

Disclosed herein is a new system, a platform, compute environment, cloud environment, marketplace, or any other characterization of the system that will enable an improved approach to training neural networks. In one aspect, the approach is called a federated-split leaning approach that combines features from known approaches but that provides a training process that maintains privacy for data used to train the model from various client devices.

FIG. 1A illustrates an example system 100 that trains a deep learning system using a modified loss function. A deep neural network (DNN) is an artificial neural network (ANN) with multiple layers between the input and output layers. The DNN finds the correct mathematical manipulation to turn the input into the output, whether it be a linear relationship or a non-linear relationship. The network moves through the layers calculating the probability of each output. For example, a DNN that is trained to recognize certain trees will go over the given image and calculate the probability that the tree in the image is a certain type. The user can review the results and select which probabilities the network should display (above a certain threshold, etc.) and return the proposed label. Each mathematical manipulation as such is considered a layer, and complex DNN have many layers, hence the name "deep" networks. The principles disclosed herein involve a federated-split deep learning technique where layers in the neural network are divided between different systems. FIG. 1A illustrates various layers of a neural network 100 that are separated between clients 102 and a server 104 and the approach disclosed herein improves privacy of data between claim 1 and claim 2 as party of a group of clients 102 and the server 104 by modifying a loss function used in the context of federate-split learning amongst the layers as shown in FIG. 1A. In one aspect, each of client 1 and client 2 can be referred to as a client system and the group of client systems can be called a plurality of client systems 102. There can be more than two client systems in the plurality of client systems 102.

DNNs can model complex non-linear relationships. DNN architectures generate compositional models where the object is expressed as a layered composition of primitives. The extra layers enable composition of features from lower layers, potentially modeling complex data with fewer units than a similarly performing shallow network.

DNNs are typically feedforward networks in which data flows from the input layer to the output layer without looping back. At first, the DNN creates a map of virtual neurons and assigns random numerical values, or "weights", to connections between them. The weights and inputs are multiplied and return an output between 0 and 1. If the network did not accurately recognize a particular pattern, an algorithm would adjust the weights. That way the algorithm can make certain parameters more influential, until it determines the correct mathematical manipulation to fully process the data. Recurrent neural networks (RNNs), in which data can flow in any direction, are used for applications such as language modeling. Long short-term memory is particularly effective for this use. Convolutional deep neural networks (CNNs) are used in computer vision. CNNs also have been applied to acoustic modeling for automatic speech recognition (ASR). The principles disclosed herein with respect to a modification of the loss function in the context of federated-split learning does not have to apply to a specific type of neural network or type of classification task such as image recognition.

In split federated learning, a deep learning model is split across at least two processors, which can be physically separate or can be two virtual machines in the cloud. One processor can be, for example, client 1 and/or client 2 as shown in FIG. 1A, or a "data provider" in general, and the other processor can be a server 104 or the "algorithm server". While client 1 and client 2 are disclosed in FIG. 1A as part of a group of clients 102, this disclosure can cover any "n" number of client devices or data providers. The group of clients 102 can also be described generally as a "data provider" 102 that runs the bottom half of a deep net architecture training run, and the algorithm server 104 can run the top half. Each of clients 1 and 2 can also individually be a data provider 102 as well. Generally, this approach keeps the data private (since it stays on the data provider 102) and the algorithm (the deep net architecture on the server 104) private since it is "split" across the two virtual machines or two nodes.

An example will make the point of how the DNNs operate. The examiner till use client 1 as the data provider and the server system 104 as the algorithm provider. Typically, in DNNs, the client 1 will initialize weights for its input data 106 and use forward propagation of the data across multiple layers 108 to a split layer 110 on the client. Client 1 then sends the split layer 110 output to the split layer 120 of the server 104. The server 104 propagates its data from the split layer 120 through its layers 122, 124 to the last layer 126 and compute a loss gradient or loss function that is backpropagated through its layers 124, 122 to the split layer 120 and then transmitted to the split layer 110 of the client 1. This disclosure focuses on new approaches with respect to the use of the loss function as well as new concepts regarding how to provide further privacy for the models by generating a weighted average of various client-side models and distributing the new weighted average of the client-side model to each of a plurality of clients.

The first concept disclosed herein related to how to improve the use of the loss function is described first. Disclosed herein is a "loss function" that is used to communicate from "n" data providers 102 to the algorithm server 104. The loss function provides a mechanism that can inject "noise" into the loss function—which adds another layer of "data privacy" for the underlying data. The noise added to the loss function can yield or generate a new loss function. In one aspect, the injection of noise can occur through the averaging step disclosed herein or other approaches to adding noise to the loss values which can be considered an approach to encryption.

An example training process 100 in federated-split learning is disclosed herein. The basic idea in any form of split learning is to split the total deep learning architecture that needs to be trained at one or more layers such that any client 102 (such as Client 1 and Client 2 in FIG. 1A) has only access to its share of layers before the split layer(s) 110, 116. For example, Client 1 only has access to an input data layer 106, another layer 108 and its split layer 110. Client 2 only has access to its input layer 112, additional layer 114 by way of example, and its split layer 116. The server 104 has access to the rest of the layers of the network after the split layer 110, 116. The server's split layer 120 is generally of a single copy while the group of clients 102 can have replicated layers (or can be different architectures) of their own layers before the split layer 120. The server 104 is shown with its split layer 120, additional layers 122, 124, and its last layer 126. The server's layers 120, 122, 124, 126 are a shared resource up to an extent.

An example training process in federated-split learning is as follows. In the arrangement shown in FIG. 1A, each of client 1 and client 2 performs a forward propagation step up to its respective split layer 110, 116. The outputs of the split layer 110, 116 are then used to asynchronously forward propagate the layers of the server 120, 122, 124, 126 after the split layer 110, 116. The loss function (classification objective function) achieved at the last layer 126 of the server 104 by each of client 1 and client 2 is populated in a queue 128. These forward propagations across client 1 and client 2 can be performed asynchronously and the queue 128 can be populated in a first-come-first-stored manner or based on some other parameters.

Once client 1 and client 2 fill up the queue 128 at the server 104 with their outputs, the server 104 then averages the loss function to obtain a single real-value for the loss. The process can be described is providing a modified loss function. The server 104 then back-propagates its layers 122, 124 up to the server's split layer 120 and then transmits the gradients just from this layer 120 to client 1 and client 2 based on this averaged loss. Each of client 1 and client 2 now performs backpropagation on its own respective layers 110, 108, 106, 116, 114, 112 based on the gradients received from the server 104. The advantage of this approach is that it is relatively more asynchronous than vanilla split learning (see the paper incorporated by reference above). It is also way more communication efficient as there is no peer-to-peer weight sharing across the clients 118.

In machine learning, backpropagation refers to an algorithm in training feedforward neural networks for supervised learning. Generalizations of backpropagation exist for other artificial neural networks (ANNs), and for functions generally—a class of algorithms referred to generically as "backpropagation". In fitting a neural network, backpropagation computes the gradient of the loss function with respect to the weights of the network for a single input-output example, and does so efficiently, unlike a naive direct computation of the gradient with respect to each weight individually. This efficiency makes it feasible to use gradient methods for training multilayer networks, updating weights to minimize loss. Gradient descent, or variants such as stochastic gradient descent, can be used as well. The backpropagation algorithm works by computing the gradient of the loss function with respect to each weight by the chain rule, computing the gradient one layer at a time, iterating backward from the last layer to avoid redundant calculations of intermediate terms in the chain rule. The term backpropagation in one aspect refers only to the algorithm for computing the gradient, not how the gradient is used. Backpropagation generalizes the gradient computation in the delta rule, which is the single-layer version of backpropagation, and is in turn generalized by automatic differentiation, where backpropagation is a special case of reverse accumulation (or "reverse mode").

The modified loss function benefits are described next. The proposed modification to the loss function used for federated-split learning can be implemented to achieve a better level of privacy. The loss function that is computed at the server 104 can be modified as the average of losses induced by each of client 1 and client 2, where each of client 1 and client 2 has a loss that is a weighted combination of minimizing a statistical distance between i) the distributions of the activations communicated by any client 102 to the server 104 from just the split layer 110, 116 and ii) the classification loss such as categorical cross-entropy or cross-entropy. In the prior published work on this concept, there was only one weighted loss function for vanilla training of split learning that requires peer-to-peer weight sharing and synchronization between clients. In the disclosed improvement, the loss function is an average of weighted loss functions. This can remove the requirements for weight sharing 118 or synchronization while increasing privacy.

Figure 1B:
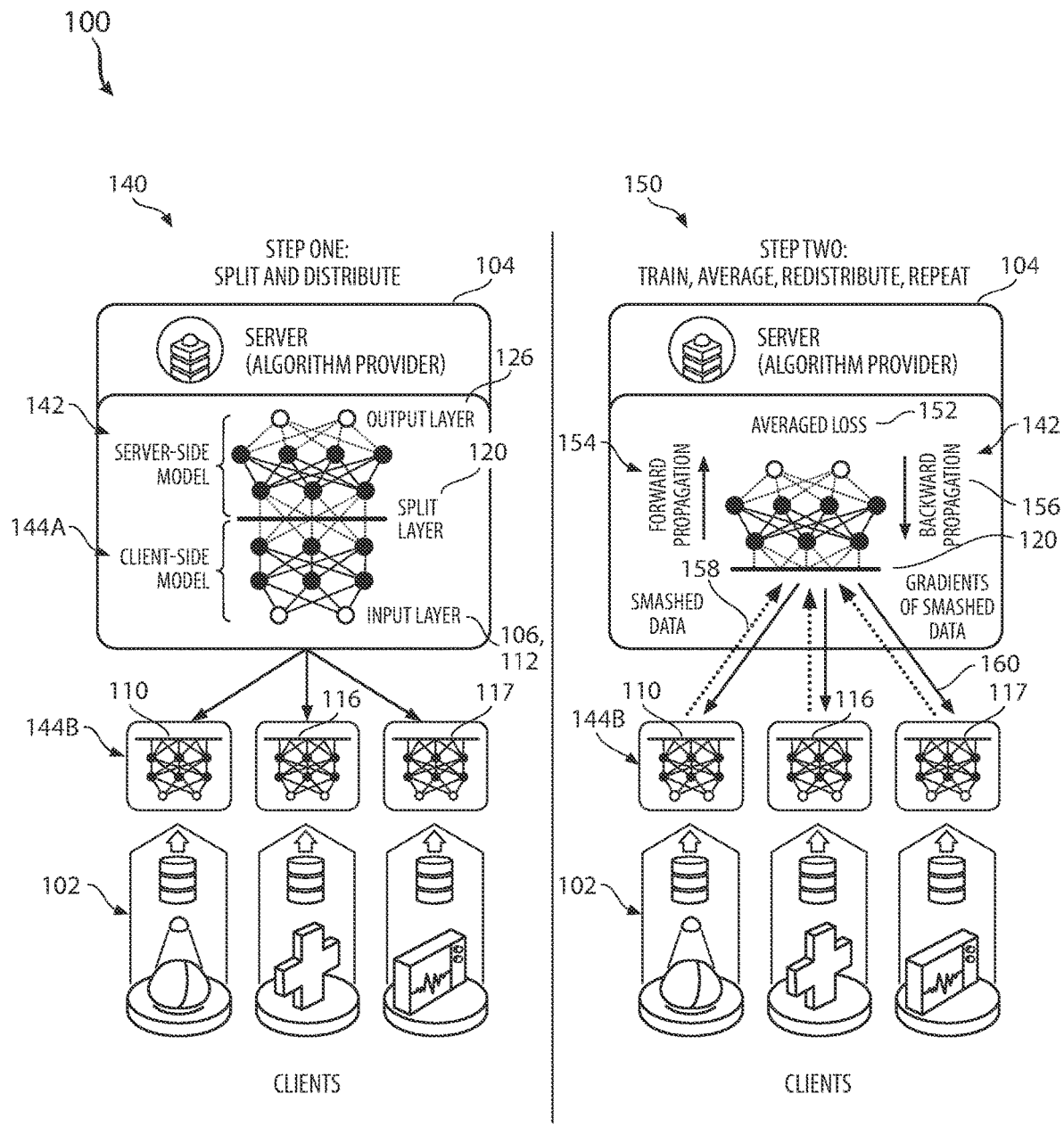
FIG. 1B illustrates a split and distribute approach followed by the averaging of the loss function and distribution of the average loss function to various clients.

FIG. 1B illustrates another variation on the structure shown in FIG. 1A with the addition of the algorithm provider 104 in step 1 as splitting the model or algorithm into a server-side model 142 and a client-side model 144A. In this case, the algorithm provider or server 104 will distribute the client-side model 144A to one or more clients 102 and the distributed client-side model 144B has its respective split layers 110, 116, 117. The serer side model has its last layer or output layer 126 and the client side model 144A is shown with the input layer 106, 112. Step 2 is shown for training, averaging the loss function, redistributing the gradients and repeating the process. Here, the batch data at each client 102 is processed through the client-side models 144B to generate the smashed data 158 which is transmitted to the split layer 120 of the server-side model 142 on the server. The "smashed data" 158 represents the data, models or vectors transmitted to the split layer 120 of the server 104 from the various clients 102. The calculation of the average loss 152 is shown as well as the forward propagation process 154 is shown on the server 104 based on the received smashed data 158 and the backward propagation 156 is shown as well. There can be a loss data 1 from the smashed data from client 1 being processed through the server-side model 142 and a loss data 2 from the smashed data from client 2 being processed through the server-side model 142. The averaged loss 152 can be generated from these two different loss data values and can be used to generate the gradients of the smashed data 160 or can be the gradients that are transmitted back through back propagation. The gradients of the smashed data 160 represent the data that is transmitted back from the server 104 to the split layers 110, 116, 117 of the various clients 102. The various clients can then update their client-side models as they propagate the gradients through their various layers. The processing of smashed data from the various clients at the deep neural network server-side model 142 is typically done in parallel.

Figure 1C:
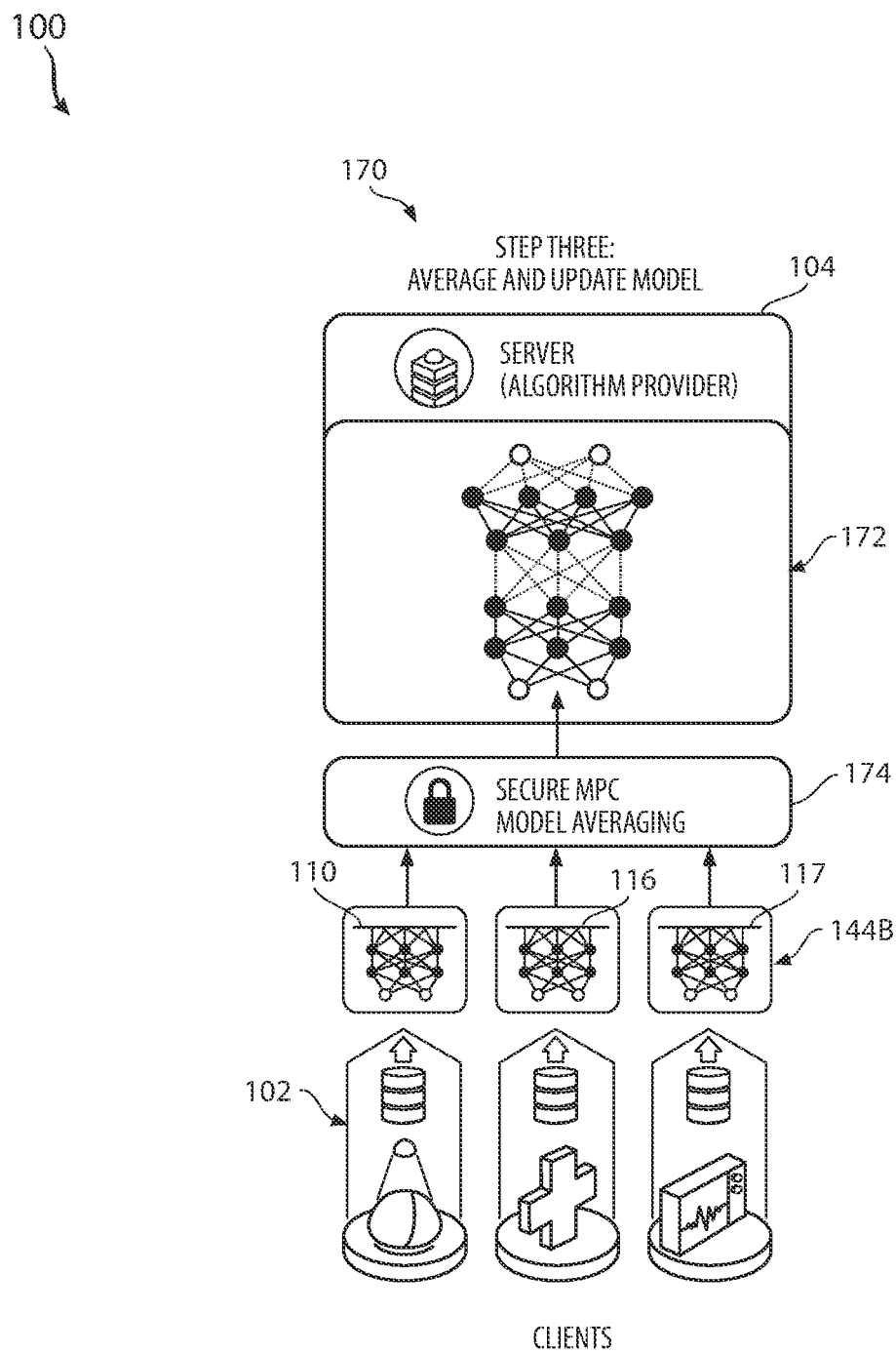
FIG. 1C illustrates a secure multi-party computation technique for generating an average of a group of client-side models.

FIG. 1C illustrates yet another example framework 170 which includes a third step of the process and which related to generating or processing a group of client-side models to obtain an average or a weighted average and then distributing the new weighted average client-side model to each of the clients 102. This approach can be called a blind training approach in that in one aspect, the various client-side models are transmitted to an averaging component 174 in an encrypted manner with rubbish data included. In some manner, which can vary, the client-side models are modified, encrypted, or changed such that the averaging component 174 has not mechanisms of viewing the data of any respective client-side model.

In one example, the process described above relative to FIGS. 1A and 1B is maintained in that batches of data are processed through the client-side models 144B, to the server-side model 142, where individual losses are identified for each set of smashed data and then averaged to generate a set of gradients that are then back propagated through the server side network 142 to the individual clients 102 for updating the client-side deep neural network models 144B. An addition process is introduced next with respect to how to further maintain the privacy of the client-side models. After an "epoch" iteration in which all the batch data of all the clients are processed, and each client-side model is updated via the received gradients from the server-side model 142, a new process is introduced to receive each client-side model, process it to generate a weighted average, and return to each client the weighted averaged model for the next epoch to proceed. The process of averaging the models can occur after each epoch, after a group of epochs, or based on some dynamic trigger such as a threshold value that indicates most much a respective model or models have changed over each epoch. The data or the batch of data is not averaged in this scenario, but the deep neural network client-side models are received and averaged (or otherwise processed) to generate a new model that is then distributed across each client 102. In one example, each model is a matrix which can be received and averaged. Each matrix may have 1 or more numbers contained therein. The entity that performs the averaging of the models might be the server 104 if it can be trusted, but in another scenario, a separate entity can provide a secure multi-party computation (SMPC) to generate the average model to be distributed back to the clients 102.

In this example, the process includes processing of the client-side models via either averaging or secure multi-party computation (SMPC) 174 of client-side models such that a new model is generated and transmitted back to the clients 102 prior to transmitting new smashed data to the split layer 120 of the server 104. Here, the server-side model 172 will receive smashed data processed by an average new client-side model generated from a secure multi-party computation (SMPC) component 174 operating on a set of client-side models to generate and distribute a new client-side model to each client 102 which can be a single model which is the average, for example, of two or more client models received from respective split layers (e.g., 110, 116, 117) from respective clients 102. The server-side model 172 can in one case be essentially the same server-side model 142 shown in FIG. 1B. In another aspect, the server-side model can be modified to accommodate or take into account the fact that in FIG. 1C, the client-side models are received and averaged by the averaging component 174 and thus will provide their respective smashed data in new epochs using such updated models.

The secure multi-party computation component 174 is part of all computational parties (server and clients) that do not trust each other. They jointly compute the average client-side model without 'seeing' each others' data by exchanging several encrypted messages about their models, which on their own represent rubbish data that cannot be decrypted into anything useful. When the entire protocol (process) completes, it can then reveal the final averaged client-side model. The forward propagation 154 and backward propagation 156 can proceed in the standard way with or without the need to average the loss functions 152 in that the various models are already averaged 174 prior to being received at the split layer 120 of the server 104. The averaging type can be a weighted average or any type of averaging approach. This averaging method can be done either in plain text or an encrypted space (SMPC) as shown in FIG. 1C. The new weighted average client-side model of the various client-side models can be generated after each epoch or round of processing all of the batches of all of the clients 102 through the transmission of smashed data to the server 104 and the receipt of gradients from the server 104 at each client to update the respective client models.

In the SMPC approach, the system does not use plain text in that the server 104 is not trusted. In the SMPC approach, each model is encrypted and sent to the server 104 (or other entity) as an encrypted model and the processing or averaging of the encrypted models is done in an encrypted way to maintain privacy. The entire model in one aspect is not sent to each server. Some "rubbish data" is included and the server 104 has only a part of the model. The server cannot decrypt, they cannot steal or see what is inside of the data in this approach. It is impossible in this sense for the server 104 to see into any of the data of the "model" transmitted to the averaging component 174. This process is more secure in that it prevents the averaging component 174 from being able to see the data of the models.

In one example, assume that a first client has a model with value 3, a second client has a model with a value 4, and a third client has a model with value 5. These models can be averaged as shown in FIG. 1C to produce a new client-side model with a value of (3+4+5)/3 or the value of 4. This new averaged model then is distributed back to each of the three clients. This approach improves both accuracy and privacy. In other words, the data of the various clients 102 can be synchronized in a way of integrating the various models such that someone seeking to identify the data of any particular model cannot determine what that respective data is.

In one example, the weighted averaging method performed at component 174 can use the following formula:

$$W = \frac{\sum_{i=1}^{n} w_i X_i}{\sum_{i=1}^{n} w_i}$$

Where W is the final aggregated client-side model, n is the number of clients, $X_i$ is the respective client$_i$ model, and $w_i$ is the number of data samples at the respective client$_i$. The denominator can represent the total number of training samples from all the clients combined or some other value as well. Typically the data (vector, model, etc.) from each client may have the same number of parameters but in some cases the number of parameters might differ across different clients.

In one example, all clients 102 start the training process by submitting the total number of training samples they have locally, which will be used to train the final model. This version of the protocol is explained in the following algorithm.

---

Algorithm 1 Blind learning algorithm

---

```
1: Client-side computation
2: for epoch in total_epochs do
3:     client_model ← recelne(averaged_client_model)
4:     for batch in total_batches do
5:         smashed data ← client_model(X)    ▷ X: client's data
6:         privacy_loss ← dloss(smashed_data, X)
7:         send(smashed_data, privacy_loss)
8:         update_client_model_params (receive (gradients))
9:     send(client_model, total_samples_number)
10:
11: Server-side computation
12: for epoch in total_epochs do
13:     for batch, client in zip(batches, clients) do
14:         ŷ ← server_model(receive(smashed_data))
15:         l ← criterion(y, ŷ)    ▷ criterion: utility loss function
16:         loss = α₁ · l + α₂ · privacy_loss
                                ▷ loss ← weighted_average_loss
17:         gradients ← update_server_model_params(loss)
18:         send(gradients)
19:     send(smpc_weighted_average(clients_models))
```

Figure 1D:
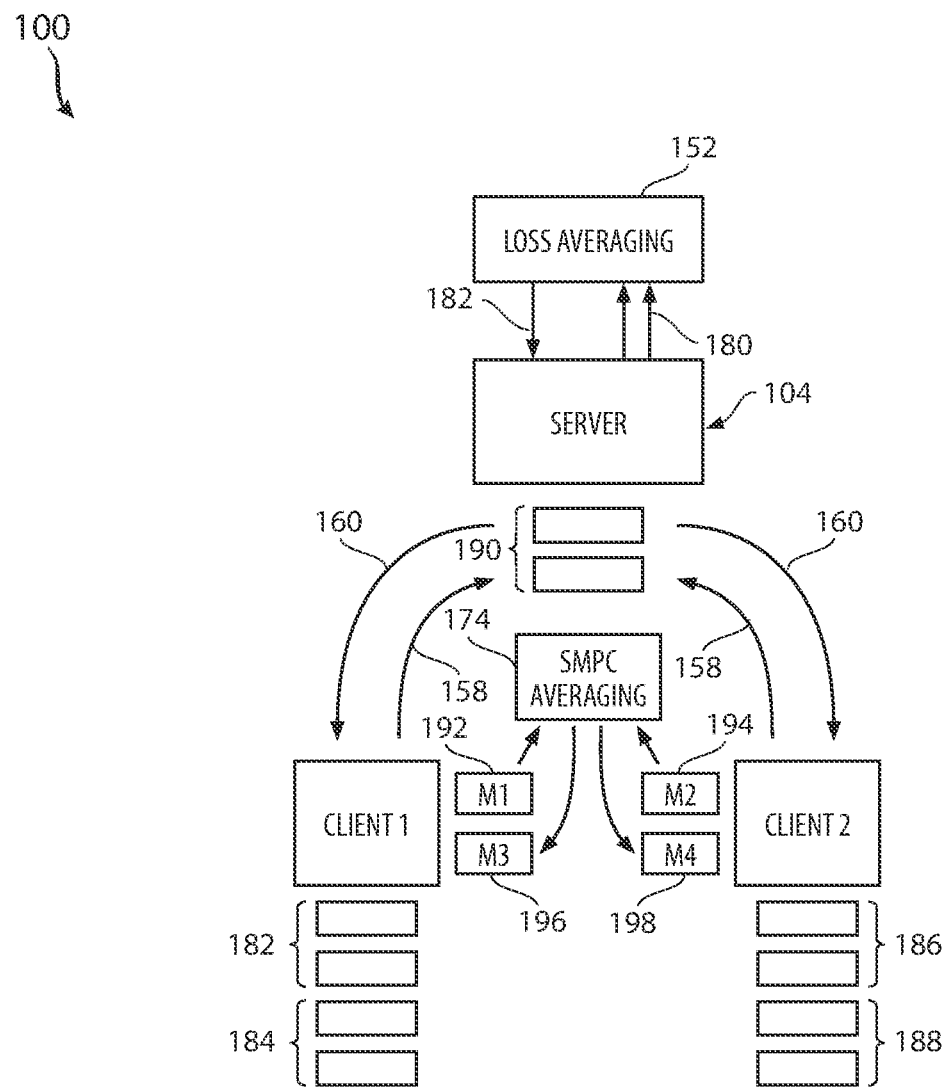
FIG. 1D illustrates an approach to receiving and averaging various client-side models and distributing a weighted average client-side model back to the various clients for further batch processing.

The algorithm shown above will be further described with respect to FIG. 1D. The client-side computations on lines 1-9 operate over an epoch which involves the processing of each batch of data. In one example, a batch of data might be two images or two pieces of data. One client might have 3 batches to process and another client might have 4 or 5 batches to process. An epoch involves completing the processing of all the data through an iteration of the client models and through the server 104 such that forward propagation and backward propagation on each batch of data is complete. In this context and as shown in FIG. 1D, the data providers can be clients 1 and 2 (the group of clients 102) and can receive a respective client model (line 3 of the pseudo code above). Each client can have data the run through the models in batches 182, 184, 186, 188. For example, each batch can have two images to be processed. In this example, client 1 has two batches 182, 184 and client 2 has two batches 186, 188. Client 1 processes its batches through its layers of its neural network model 192 (M1) and generates smashed data 158 that is transmitted to the split layer 120 of the server 104 or algorithm provider. The server 104 receives each batch (lines 13-14 of the pseudocode) or smashed data associated with that batch and processes the smashed data through its layers using the server model. Client 2 processes its batches through the layers of its neural network model 194 (M2) and generates smashed data 158 that is transmitted to the split layer 120 of the server 104 or algorithm provider. The clients 102 can also generate a privacy_loss value associated with the smashed data and send the smashed data and privacy_loss data to the server 104. The privacy_loss can be used in averaging the loss functions as described herein.

The server 104 processes the smashed data through its layers as well. The data from the various clients 180 is provided to the loss averaging component 152 that averages the loss as described herein (lines 15-16 of the pseudocode) and returns the gradients 182 (lines 17-18 of the pseudo code) through the server's layers for backward propagation 156 as shown in FIG. 1B. The gradients of the smashed data 160 are returned to client 1 and client 2 (line 18 of the pseudocode) such that continued back propagation through the respective layers can be finalized and respective update client-side models can be generated. Line 8 of the pseudo code described updating the client models based on the received gradients. Assume in this example that the model M1 192 of client 1 and the model M2 194 of client 2 are the updated client model described in line 8 of the pseudo code. Once all the different batches are processed through forward propagation and back propagation, an "epoch" has been completed. See line 2 of the pseudo code.

Figure 2A:
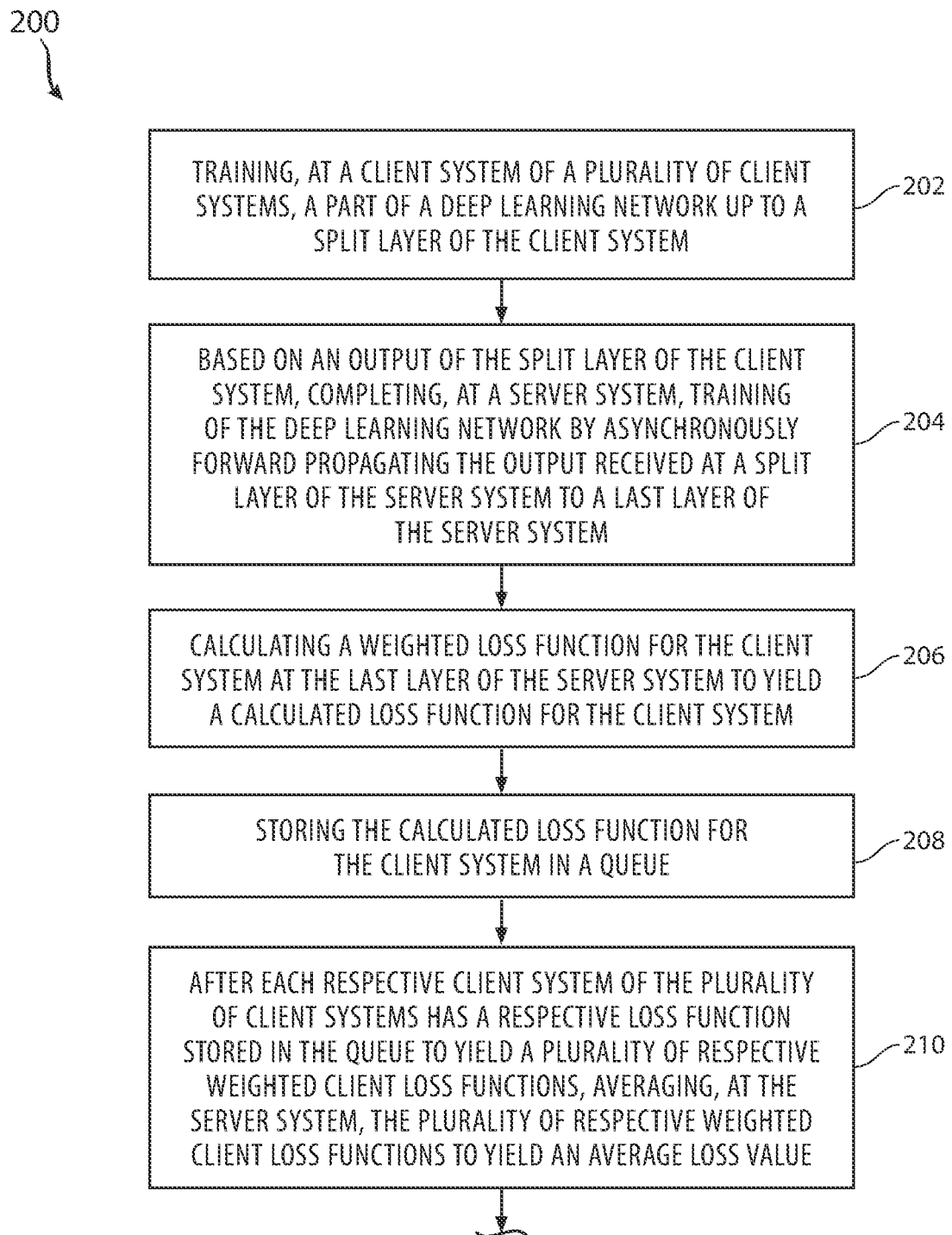
FIG. 2A illustrates an example method associated with calculating a weighted loss function.
Figure 2A:
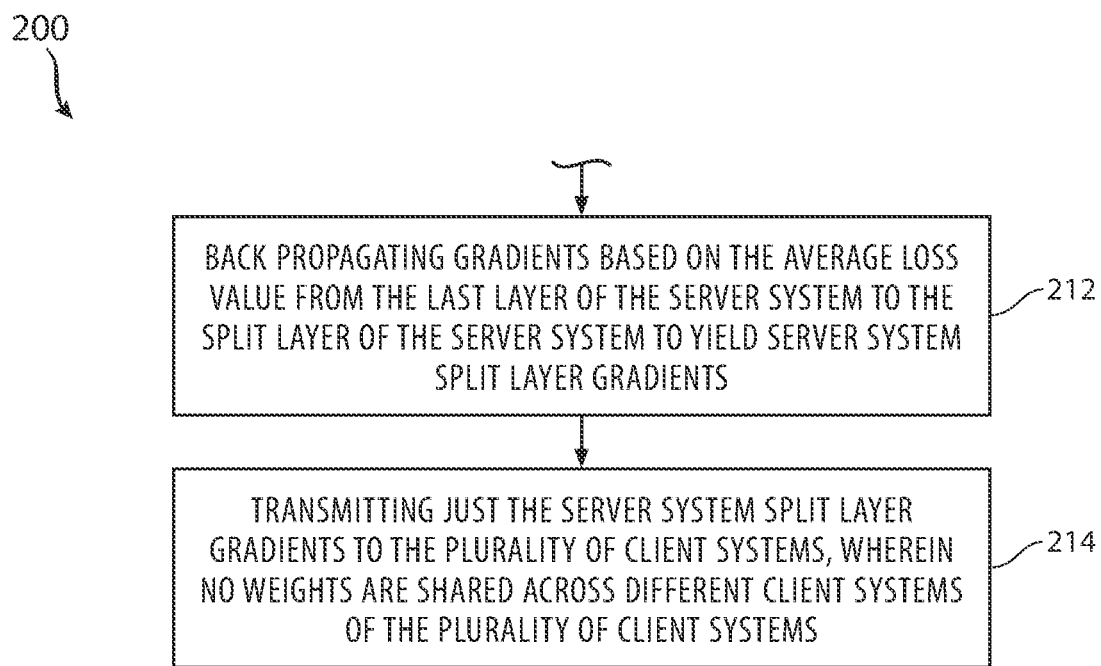

At this stage, once an epoch has been completed and the various client models are updated based on the received gradients, the clients each send their (updated) client model M1, M2 and/or the total number of samples to the processing component 174 that can average the models or generated a weighted average model and/or perform SMPC on the various models and return the updated model such as updated model M3 196 to client 1 and updated model M4 198 to client 2. Typically, M3 and M4 will be the same updated average model but in some cases they could have some differences based on one or more parameters. Line 19 of the pseudocode indicates the operation of sending the weighted average of the client models to the various clients. This averaging method can be done either in plain text or an encrypted space (secure MPC). FIG. 2C below illustrates an example method for the use of the secure multi-party computation technique shown in FIG. 1C. FIG. 2A illustrates a method example. A method 200 can include one or more of the following steps in any order. The method in this case includes steps performs by both client 1, client 2 (the plurality of client systems 102) and the server 104. The method can include training, at a client system of a plurality of client systems 102, a part of a deep learning network up to a split layer 110, 116 of the client system (202), based on an output of the split layer 110, 116 of the client system, completing, at a server system 104, training of the deep learning network by asynchronously forward propagating the output received at a split layer of the server system 120 to a last layer 126 of the server system 104 (204). The output received at the split layer 120 of the server system 104 is the output of the split layer 110, 116 of the client system 102. The method can include calculating a weighted loss function for the client system 102 (for each of client 1 and client 2) at the last layer of the server system 126 to yield a calculated loss function for the client system 102 (206) and storing the calculated loss function for the client system in a queue 128 (208). This process can occur for multiple clients such that the queue receives a plurality of respective calculated loss function values.

The method can further include, after each respective client system of the plurality of client systems 102 has a respective loss function stored in the queue 128 to yield a plurality of respective weighted client loss functions, averaging, at the server system 104, the plurality of respective weighted client loss functions to yield an average loss value (210), back propagating gradients based on the average loss value from the last layer 126 of the server system 104 to the split layer 120 of the server system 104 to yield server system split layer gradients (212) and transmitting just the server system split layer gradients to the plurality of client systems 102 (to client 1 and client 2), wherein no weights are shared 118 across different client systems of the plurality of client systems 102 (214).

The weighted loss function can further involve a minimizing of a statistical distance between (1) a distribution of activations communicated by the client system 102 to the server system 104 from just the split layer 110, 116 of the client system 102 and (2) a classification loss. In one aspect, the classification loss can include a categorical cross-entropy or a cross-entropy. Cross-entropy loss, or log loss, measures the performance of a classification model whose output is a probability value between 0 and 1. Cross-entropy loss increases as the predicted probability diverges from the actual label. Cross-entropy can be calculated using the probabilities of the events from P and Q, as follows: H(P, Q)=−sum x in X P(x)*log(Q(x)).

There are different names and variations of cross-entropy loss. There are functions that apply transformations to vectors coming out from convolutional neural networks (CNNs(s)) before the loss computation. A sigmoid function forces a vector into a range from 0 to 1 and is applied independently to each element of (s), $s_i$. A Softmax function forces a vector into the range of 0 and 1 and all the resulting elements add up to 1. It is applied to the output scores (s) and cannot be applied independently to each since it depends on all the elements of (s). For a given class $s_i$, the Softmax function can be computed as:

$$f(s) = \frac{e^{si}}{\sum_{j}^{C} e^{sj}},$$

Where $s_j$ are the scores inferred by the net for each loss in C. Note that the Softmax activation for a call $s_i$ depends on all the scores in s.

The categorical cross-entropy loss is also called Softmax Loss. It is a Softmax activation plus a cross-entropy loss. This approach can be used to train a CNN to output a probability over the C classes for each item and can be used for multi-class classification.

In one aspect, storing the calculated loss function for the client system (client 1 and client 2) in the queue 128 further can include storing a respective calculated loss function for each respective client system of the plurality of client systems 102. In another aspect, storing a respective calculated loss function for each respective client system of the plurality of client systems 102 can be performed asynchronously on a first-come-first-stored manner.

In yet another aspect, transmitting just the server system split layer gradients to the client system 102 further can include transmitting just the server system split layer gradients to each client system (client 1 and client 2) of the plurality of client systems 102.

Another step of the method disclosed above can include back propagating, at the client system 102 and from the split layer 110, 116 of the client system 102 to an input layer 106, 112 of the client system 102, the server system split layer gradients to complete a training epoch of the deep learning network. An epoch is where an entire dataset is passed forward and backward through a neural network once.

Another aspect of this disclosure relates to a scheduler. The choice of every client's individual weights can be data and task dependent. In order to restrict privacy leakage during tuning or after the first epoch's forward propagation step when a back propagation step has not been performed yet, a scheduler is proposed to prevent leakage of privacy. The scheduler can be a software module operating on one or both of a client 102 and/or a server 104 or may be configured as a separate device. The scheduler ensures the weight for the privacy during the early epochs is very high and it reduces gradually up to a specified point, as the epochs go by, and then stagnates and makes sure it doesn't fall below a specific value, to ensure the privacy weight is not too low to induce leakage.

A simulated reconstruction attack can be performed on the client system 102 before releasing any activations to the server 104 at the split layer 110, 116 of the client system 102. In order to squeeze out more accuracy, the accuracy weight can gradually be increased and tuned by the server 104, followed by the simulation of the reconstruction attack, prior to transmitting the activations from the split layer 110, 116 to the server 104. The following is some example code which can be deployed by a scheduler:

def decay Scheduler(epoch, lr, maxLR, totalEpochs):

```
decay = lr / totalEpochs
    if epoch < 3:
    return lr
else:
    return max(lr * 1/(1 + decay * epoch), maxLR).
```

A variation of FIG. 2A can include the steps performed either just by the server 104 or by one or more of the client 102. For example, from the server standpoint, the method can include receiving, at a server system and from a client system of a plurality of client systems, smashed data associated with the client system, completing, at the server system, training of a deep learning network by asynchronously forward propagating the smashed data received at a split layer of the server system to a last layer of the server system, calculating a weighted loss function for the client system at the last layer of the server system to yield a calculated loss function for the client system and storing the calculated loss function for the client system in a queue.

After each respective client system of the plurality of client systems has a respective loss function stored in the queue to yield a plurality of respective weighted client loss functions, the server 104 can perform the operations of averaging, at the server system, the plurality of respective weighted client loss functions to yield an average loss value, back propagating gradients based on the average loss value from the last layer of the server system to the split layer of the server system to yield server system split layer gradients and transmitting, from the server system, the server system split layer gradients to the plurality of client systems, wherein no weights are shared across different client systems of the plurality of client systems.

In another variation, the method can be performed from the standpoint of a client 102 in which the smashed data 158 is transmitted to the split layer 120 of the server 104. The server 104 performs the operations described herein to generate the gradients that include the averaged loss function 152. Each respective client receives the gradients 160 and updates its respective model 144B based on the received gradients 160. The processing can occur such that each batch of data input to the respective client-side model 144B is processed for all the clients 102 both for both forward and backward propagation through the neural network to achieve an "epoch", at which point the other processing can occur which is described below to perform a blind learning process of receiving the various updated client-side models 144B at a secure multi-party calculation (SMPC) component 174 to generate in a secure manner an average of the client-side models. The SMPC component 174 can then redistribute the weighted average of the client-side models 196, 198 to each respective client 102.

Figure 2B:
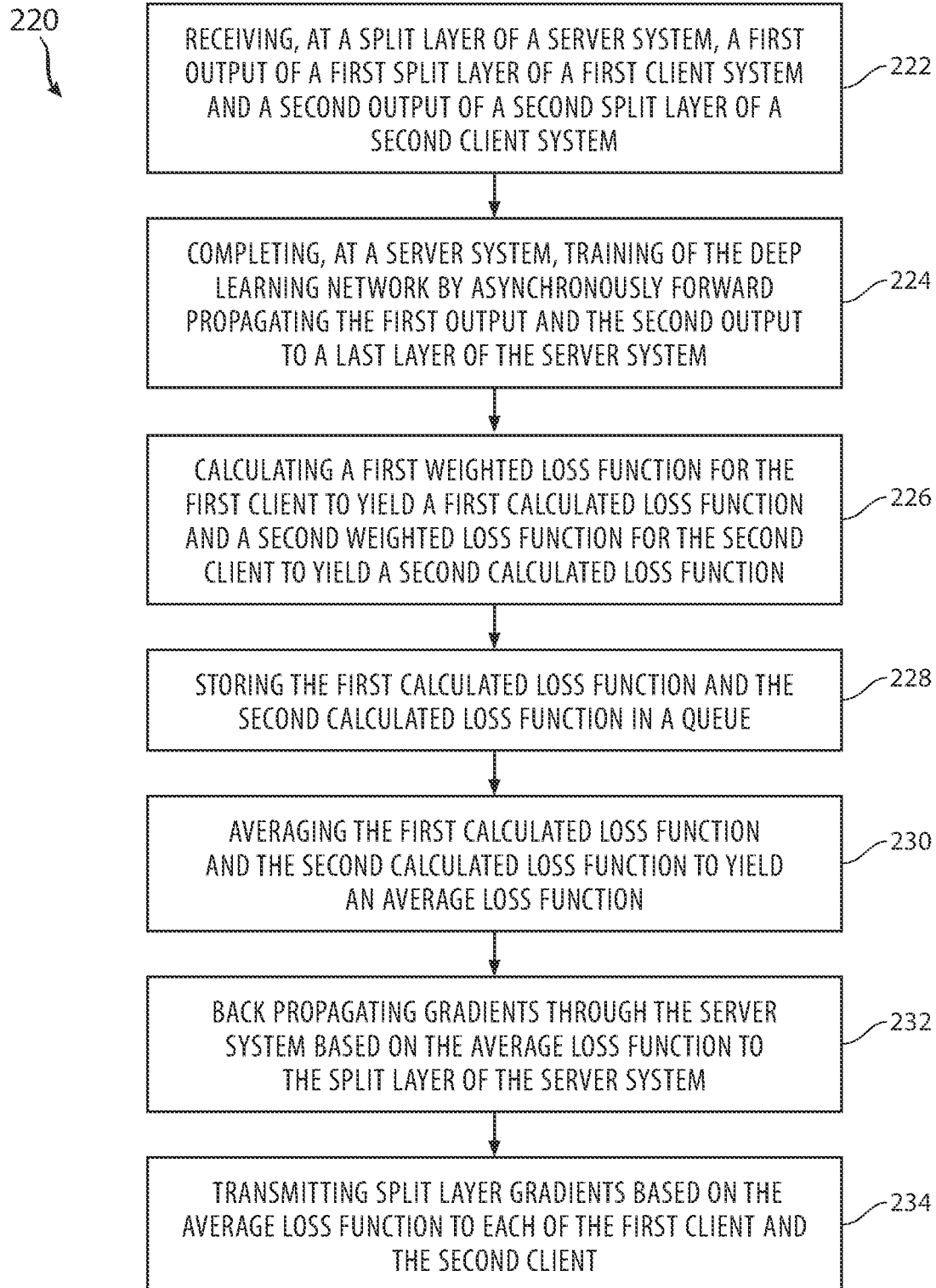
FIG. 2B illustrates an example method from the standpoint of the server or the algorithm provider.
Figure 2C:
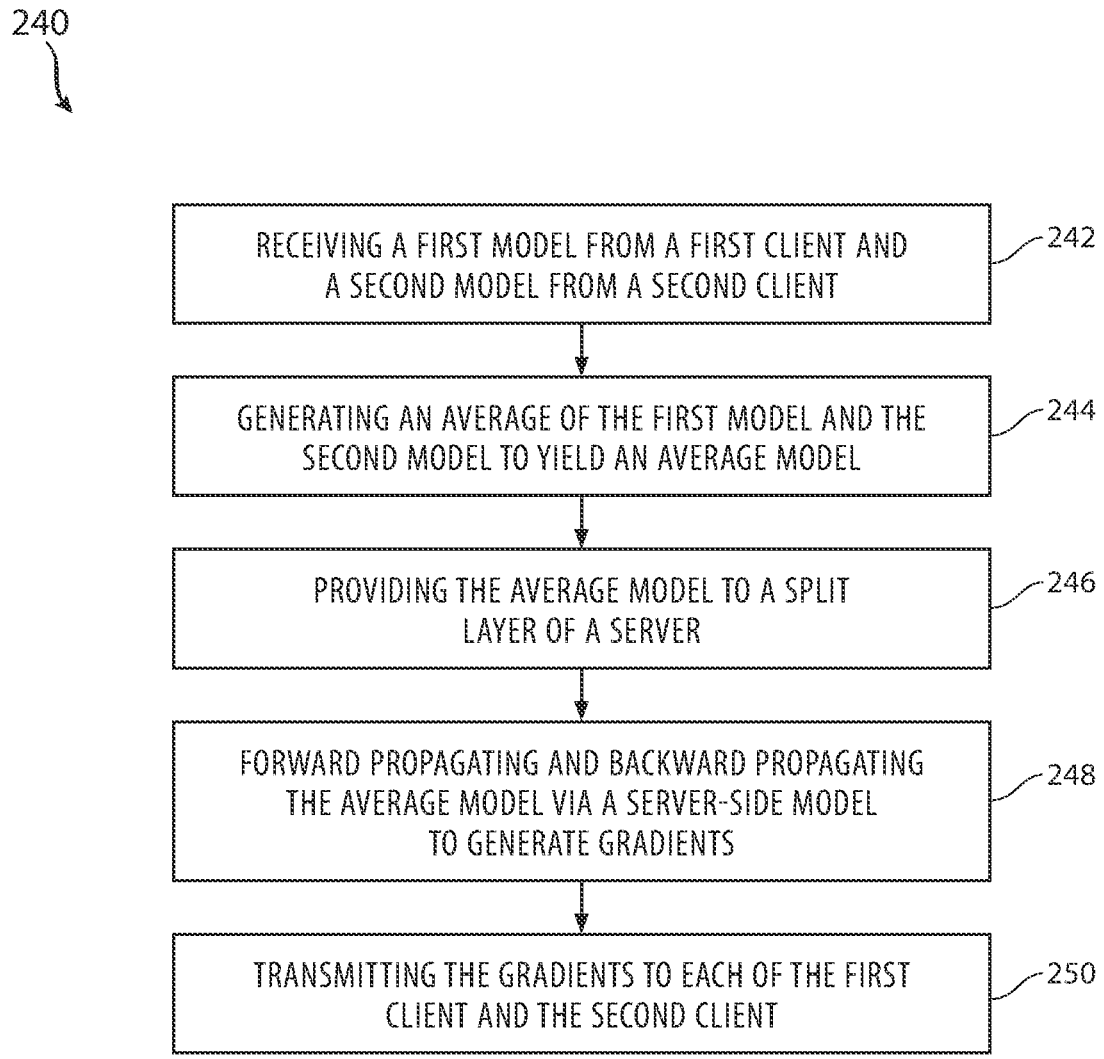
FIG. 2C illustrates a method of providing a secure multi-party computation technique in the context of a split-federated learning environment.

FIG. 2B illustrates an example method performs by just the server 102. The method 220 in this example includes one or more steps in any order of receiving, at a split layer 120 of a server system 104, a first output of a first split layer 110 of a first client system and a second output of a second split layer 116 of a second client system (220), completing, at a server system 104, training of the deep learning network by asynchronously forward propagating the first output and the second output to a last layer 126 of the server system 104 (224), calculating a first weighted loss function for the first client to yield a first calculated loss function and a second weighted loss function for the second client to yield a second calculated loss function (226) and storing the first calculated loss function and the second calculated loss function in a queue 128 (228). This process can occur for multiple clients such that the queue receives a plurality of respective calculated loss function values. The method can further include averaging the first calculated loss function and the second calculated loss function to yield an average loss function (230), back propagating gradients through the server system 104 based on the average loss function to the split layer 120 of the server system 104 (232) and transmitting split layer gradients based on the average loss function to each of the first client and the second client (234). A similar method could be provided with steps just performed by client 1 and/or client 2.

FIG. 2C illustrates the secure multi-party computation (SPMC) technique shown in FIG. 1C. The method 240 can include one or more steps of receiving a first model from a first client and a second model from a second client (242), generating an average of the first model and the second model to yield an average model (244) and providing the average model to each of the first client and the second client as an updated model (246). Then, the clients can proceed to another epoch with new batches of data using the new model which they have each received. The benefit of this approach is that it can improve the security and privacy of the model. Secure MPC is not performed by the server 104 alone. In one aspect, by definition, it can't be performed by a trusted party as there are no trusted parties. Secure MPC is performed jointly between the server 104 and the clients 102 by exchanging parts of their models encrypted using SMPC. The parts of the models alone cannot yield or reveal any information about the individual client-side models 144B, but after the entire process is completed, an averaged client-side model will be revealed. The server 104 (or some other node) coordinates this process. Note that the coordination can be different from the actual process of averaging though. If the averaging was happening in plain text, then this process would need to be performed by a trusted party.

More than two client models can be received and averaged and there can be various algorithms for generating the average. The use of weighted average approach can help to maintain the privacy and security of the data from the various clients 102 or data providers. As noted above, the method can include transmitting a modified version of each client-side model such that the modified model to be processed or averaged includes some rubbish data, a portion of the full data of the client-side model, and can be encrypted. The portion of the data of each client-side model, for example, can represent less than all of the available data of each client-side model. Which portion is transmitted to the averaging component 174 and which portion is not can be determined based on a percentage, which part of the model data should be kept back, or based on some other parameter(s) to determine how to select the portion of the client-side data in the client-side model to use for the averaging process. The process above involves how to train a new model on decentralized data in a privacy-learning way in a blind-learning approach. In blind-learning approach, the averaging component 174 does not see or cannot view the various client-side models 144B that it receives because they are sent to the averaging component 174 in such a way so as to preserver privacy.

As noted above, the client-side models can be processed such that they are one or more of encrypted, inclusive of some rubbish data, a portion of each respective client-side model or a combination of these and other ways in which the respective client-side models can be modified such that as they are processed by the averaging component 174, the respective data of each model is kept private and unsearchable. This is because typically the averaging component 174 is part of the server 104 and not trusted or generally is not trusted and needs to perform its processing without being able to probe into the data associated with the respective client-side model.

Receiving a first model from a first client and a second model from a second client can occur after an epoch in which all batches of data for the first client and the second client are processed by respectively by each of the first client, the second client, and a server-side model 142 to generate gradients received at the first client and the second client to update their respective models to yield the first model and the second model, which are then averaged by the averaging component 174.

The process can also in one example be performed from the clients 102. In this case, the clients 102 transmit their respective smashed data to the server 104 and receive gradients back from the server 104. The clients 102 then update their respective models based on the gradients received from the server 104. This can conclude one epoch. The gradients may or may not include the averaged loss function described above. The clients 102 then each send their updated client-side models to an averaging component 174 which may or may not be part of the server 104. The client-side models might be encrypted or modified such that not all of the model data is transmitted. In another aspect, the client-side models can include some rubbish data as well. The averaging component 174 generates in a secure way a weighted average client-side model and each client of the clients 102 receives the weighted average client-side model from the averaging component 174.

Figure 3:
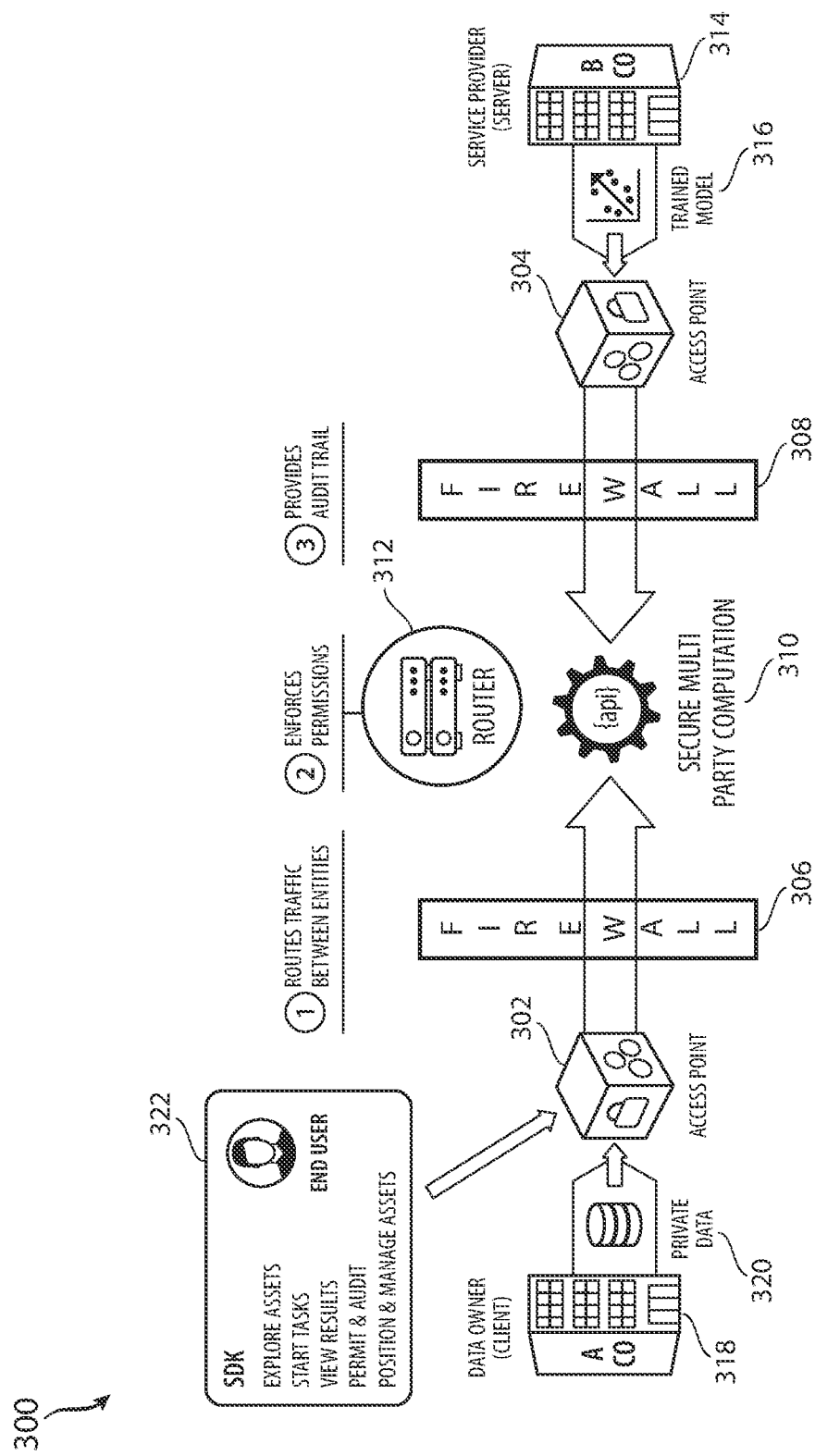
FIG. 3 illustrates a secure multi-party computation approach.

FIG. 3 illustrates an architecture 300 for orchestrating a secure multi-party communication. Federated learning (FL) and blind Learning (BL) are two deep learning paradigms to learn from decentralized datasets without transferring the data to a centralized location. In both methods, a centralized server 104 manages the training process. At the end of each training epoch (iteration), the server 104 (or averaging component 174) receives and averages the local models 192, 194 trained at each client to generate a global model. While FL and BL can preserve some data privacy by not transferring it to the server 104, a malicious server can exploit the clients' models during the averaging process to extract some sensitive information from the models' weights. To prevent this, the secure averaging function is introduced that prevents the server 104 from "seeing" the clients' models 192, 194 in plain text. Specifically, the secure averaging 174 encrypts the model of each client before sending it to the server 104/174, which then (the server) averages the encrypted models to generate the global model 196, 198. The global model 196, 198 is then distributed to the clients 102. In this way, the server 104 cannot exploit sensitive data from any specific client's model 192, 194.

The architecture 300 makes it possible and convenient for two or more parties (318, 314) To participate in a variety of collaborative activities involving data at an algorithm and processes. Part of the novelty of the system is the orchestration technique which allows this to occur between the different parties (318, 314).

The components shown in FIG. 3 includes an access point 302 associated with the data owner or client or other entity 318. The access point 302 can include the software component such as a docker instance which runs on the infrastructure for that party. Another access point 304 can be associated with a service provider or server 314. This access point can also include a software component such as a docker instance that runs on the infrastructure for that party. Router 312 can provide a centralized system that allows browsing of shared assets, coordination, orchestration and validation of joint operations. It also allows for the auditing of operations. See notes 1, 2 and 3 in FIG. 3. Note that the router 312 can be represented by any node and could also have its operations performed by the server 104 or a third party compute node.

The parties 318, 314 can represent any individual or organization or the computer or server associated with that party. An asset as defined as a digital file or collection of the digital files that belong to a single party 314, 318. Shown in FIG. 3 is private data 320 for one entity 318 and a trained model 316 for another entity 314. The data asset can be an asset representing data records, such as database rows, image files, or other digital representations of information. An algorithmic asset is an asset that represents an operation which can be performed on a data asset. An algorithm could be trained to machine learning model, a procedural program or other types of operation. "Permission" as used herein can represent the affirmative approval of one party to another allowing the use of an asset owned by one of the parties. Note that in one example, the assets that are processed can be the same type of asset (both models 316 or both data 320) or in another example they can be of different types (data 320 and model/algorithm 316).

An "agreement" is a codification of rules which can be used to determine whether a usage of assets should be granted permission. As noted above, the router 312, per item 2 in FIG. 3, enforces permissions as part of the process. A secure multi-party computation application programming interface (API) 310 can be used to communicate between the various parties 318, 314 through a respective firewall 303, 308. A software development kit (SDK) 322 can provide instructions and libraries to the respective access points 302, 304, to interface with the API 310.

The operation of the system is as follows. Each party 318, 314 can independently register the existence of assets which are stored behind their access point 302, 304. The registration creates an entry in the router 312 and creates a unique asset identifier (ID) from which the owner and location of the asset can be determined. Any node can be used for storing or registering the assets. The router or other node 312 can provide both graphical and programmatic mechanisms for finding and obtaining information about the registered assets. The unique identifier for each asset is thus available. However, the exact content of the asset remains hidden behind respective access point 302, 304. The asset owners 318, 314 can provide or expose metadata information about the respective assets such as a name, a textual description, various types of summaries such as an exploratory data analysis and/or a pseudo sample of the asset. Next, with its data in place, the system initiates the operation of secure multi-party computation. One party will identify the assets involved in the operation. Typically, this will be a data asset 320 from the data owner 318 and an algorithm asset 316 from the service provider 314. However, this could also be two models 316 that are to be averaged or processed in some way together. The specifics of the proposed operation are bundled and submitted to the router 312. However, in the context of model averaging and using SMPC for model averaging as shown in FIG. 1C, the assets can each be different models from different systems such as different clients 102.

A validation of operation occurs next. The router 312 can verify the existence of the assets, and then will confirm that permission exists to use them per step 2 of FIG. 3. Any existing agreements will be first checked to see if the proposed use matches the agreement parameters. For example, an agreement might be stored that party A will allow party B to perform the specific algorithm on the specific data asset at any time. If a match is found, then permission is granted. If no matching agreement is found for any of the assets, the owner of the asset is notified of a request to utilize their assets in the operation. The owning party can accept or reject the usage request.

Until permission is granted for all assets involved in the operation, the operation will not begin execution. After the operation is validated, the router 312 contacts the initiating party's access point 302, 304 to notify it that the operation can begin. That access point 302, 304 will reach out to the other party's access point 302, 304 to create a temporary connection for the operation. The other access point 302, 304 will verify the identity of the initiator of the operation and the specific operation with the router 312 before accepting the connection.

Next, the operation is executed. The computation can now begin between the access points 302, 304 of the parties 314, 318. During an SMPC operation, portions of the one-way encrypted version of both the data and the algorithm are exchanged. Then the computation proceeds jointly, with each of the access points 302, 304 providing some of the computational resources and exchanging intermediate one-way encrypted state data as the algorithm progresses. Once the algorithm completes, the result emerges un-encrypted and is stored as a new asset behind the initiating party's access points 302, 304.

Note that the discussion above suggests that the assets involved in the operation must only be in one case data and another case an algorithm. This disclosure is broader than that. In one case, both of the assets might be an algorithm or a model 316. In this case, with reference to FIG. 1C, the SMPC process might involve receiving a first model from a first entity 318 and receiving a second model from a second entity 314 and utilizing the approach described above, performing a secure multi-party computation which can involve exchanging portions (i.e., less than the full amount of) a respective one-way encrypted version of respective models from the model providers (see clients 102 in FIG. 1C), and then providing the computation to proceed jointly with each of the access points 302, 304, providing some of the computational resources and exchanging intermediate one-way encrypted state data as the algorithm progresses. Rubbish data could be used to fill in the portion of the asset not provided or to otherwise obfuscate the data of the model or asset. Note that in one example, the computational resources can be provided by one or more of the clients 102, the access points 302, 304, the entities 314, 318, the server 104 and/or a third party.

Figure 4A:
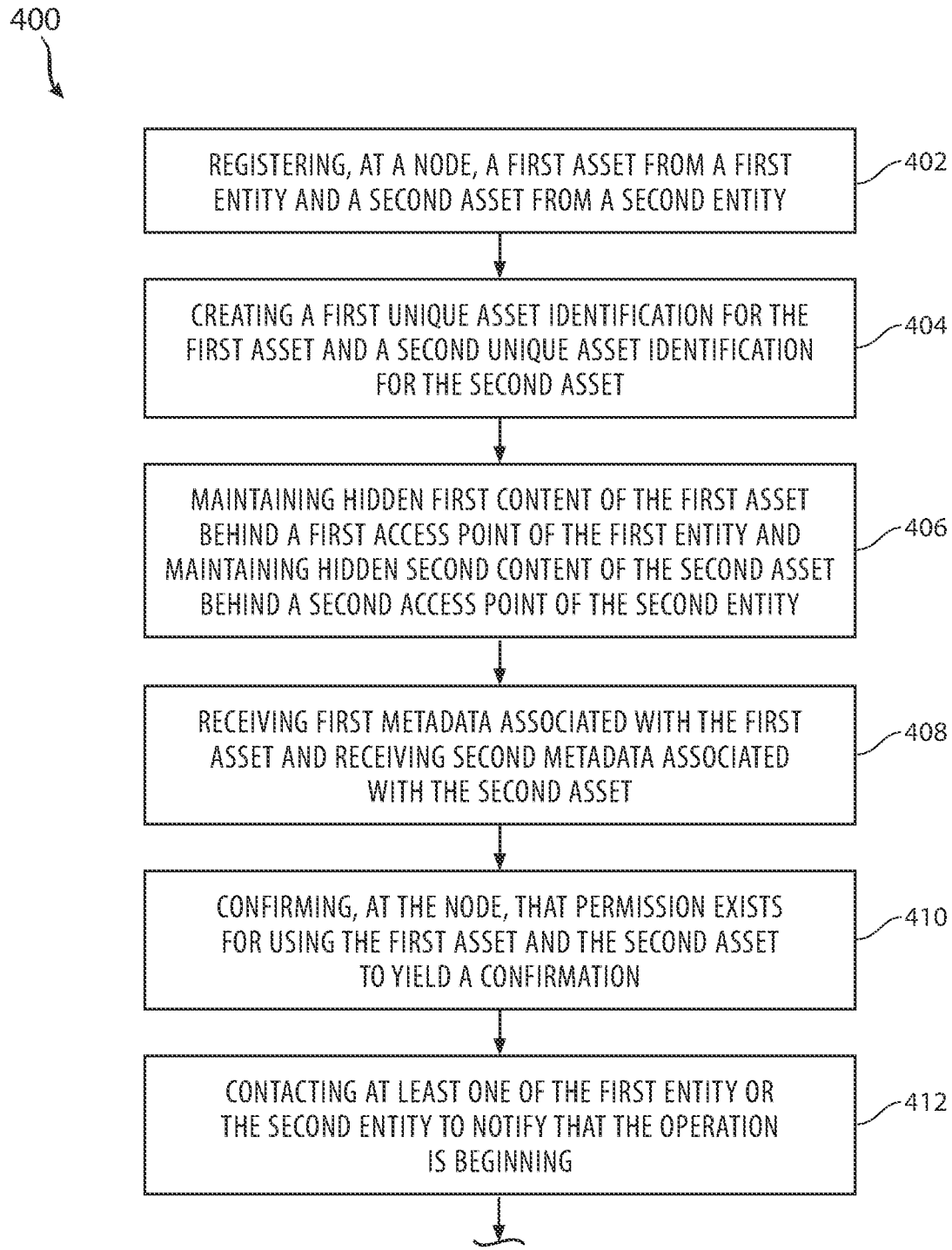
FIGS. 4A-4B illustrate example methods related to the use of a secure multi-party computation approach.
Figure 4A:
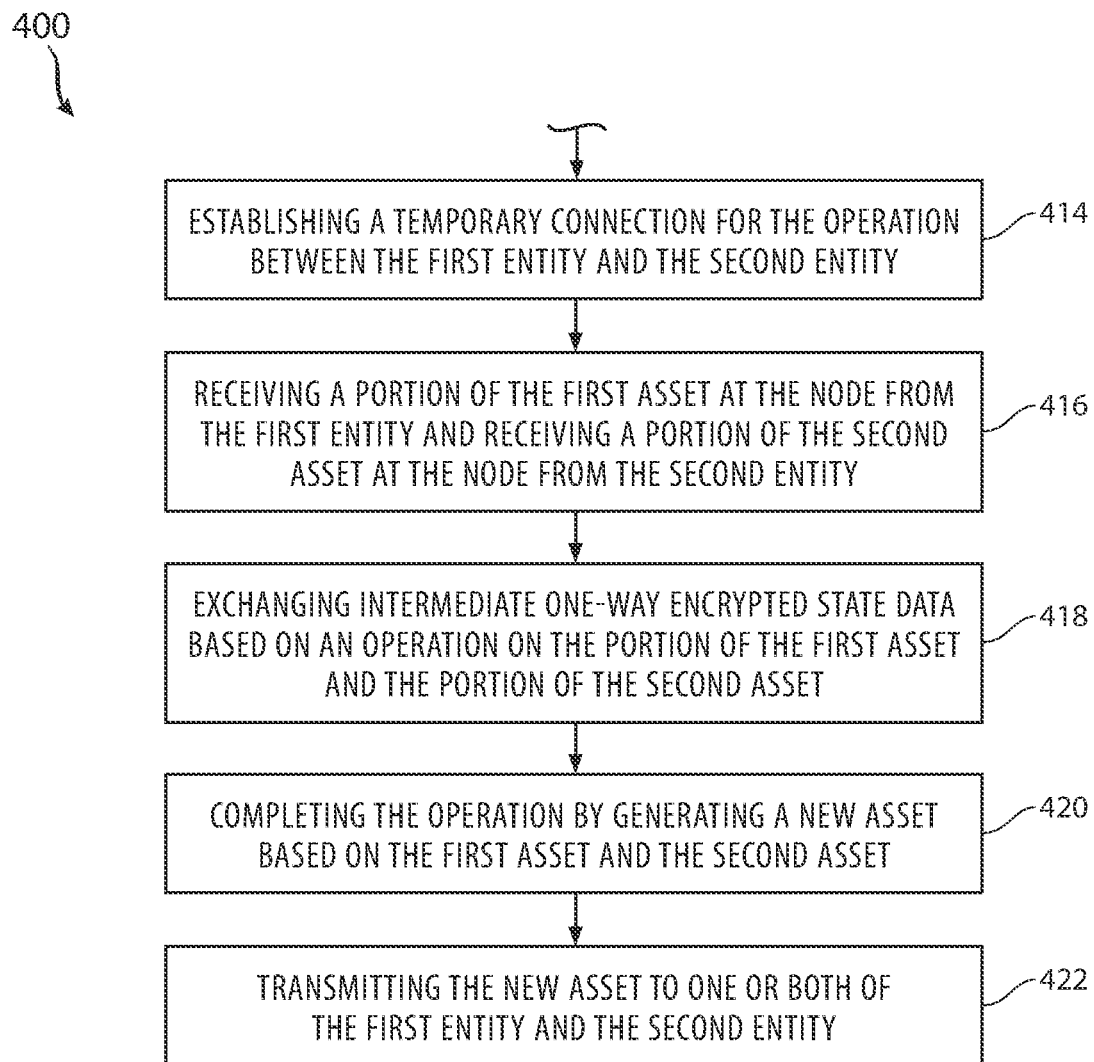

FIG. 4A illustrates an example method 400 for performing a secure multi-party communication. The method 400 can include one or more of the following steps: registering, at a node, a first asset from a first entity and a second asset from a second entity (402), creating a first unique asset identification for the first asset and a second unique asset identification for the second asset (404), maintaining hidden first content of the first asset behind a first access point of the first entity and maintaining hidden second content of the second asset behind a second access point of the second entity (406), receiving first metadata associated with the first asset and receiving second metadata associated with the second asset (408). The assets might be of the same type (data or models) or might be of different types as well. The method can further include confirming, at the node, that permission exists for using the first asset and the second asset to yield a confirmation (410), contacting at least one of the first entity or the second entity to notify that the operation is beginning (412), establishing a temporary connection for the operation between the first entity and the second entity (414), receiving a portion of the first asset at the node from the first entity and receiving a portion of the second asset at the node from the second entity (416), exchanging intermediate one-way encrypted state data based on an operation on the portion of the first asset and the portion of the second asset (418), completing the operation by generating a new asset based on the first asset and the second asset (420) and transmitting the new asset to one or both of the first entity and the second entity (422).

In one aspect, the new asset emerges un-encrypted and this stored as a new asset behind the initiating party's access point 302, 304. In the context of model averaging, the new asset represents an average of the models 316 provided to the node or to the operation from different entities such as different clients 102. In this case, the new asset or new version of the model is distributed to each respective client that provided an initial model for the model averaging operation. Note that the example above involves the use of two different assets or models in this case but the model averaging could also occur with more than two entities providing assets (models, algorithms or data).

This disclosure explicitly notes that the method can include any combination of the steps outlined above. The steps can also be performed in any order. The patent application 63/226,135, filed on Jul. 27, 2021, incorporated herein by reference, provides further details regarding the SMPC process. Note as well that in that document, there are examples which suggest that the process only occurs for data as one asset and an algorithm as the other asset. The assets could also both be models such as the client side models 144A that are transferred to the client computers as models 144B shown in FIG. 1B. These models (also referenced as models 192, 194 in FIG. 1D) can be transmitted to a node or a node could be used such as the router 312 in FIG. 3 to cause the data to be exchanged via an API 310 for generating an average model (which may or may not be weighted) which can then be distributed across the varies clients as disclosed herein. Thus, the SMPC process can be applicable to the scenario of not just having algorithms operate on data, but on two models being processed or averaged.

The SMPC process can also be used to enable n parties (clients 102) to securely average their models 192, 194 with the server 104 without peer-to-peer socket communication. Specifically, the system or clients 102 can encrypt each model using a Diffie-Hellman key. The server 104 or averaging component 174 acts as the communication channel for the key exchange using Diffie Hellman. It is proven that the Diffie Hellman is secure in case of the corrupted communication channel; so clearly, the server 104 does not learn the actual key.

Those of skill in the art will understand the Diffie-Hellman key exchange. This key exchange establishes a shared secret between two parties that can be used for secret communication for exchanging data over a public network.

An analogy illustrates the concept of public key exchange by using colors instead of very large numbers:

The process begins by having the two parties, Alice and Bob, publicly agree on an arbitrary starting color that does not need to be kept secret. In this example, the color is yellow. Each person also selects a secret color that they keep to themselves—in this case, red and blue-green. An important part of the process is that Alice and Bob each mix their own secret color together with their mutually shared color, resulting in orange-tan and light-blue mixtures respectively, and then publicly exchange the two mixed colors. Finally, each of them mixes the color they received from the partner with their own private color. The result is a final color mixture (yellow-brown in this case) that is identical to the partner's final color mixture.

If a third party listened to the exchange, it would only know the common color (yellow) and the first mixed colors (orange-tan and light-blue), but it would be difficult for this party to determine the final secret color (yellow-brown). Bringing the analogy back to a real-life exchange using large numbers rather than colors, this determination is computationally expensive. It is impossible to compute in a practical amount of time even for modern supercomputers. This is a simple example of the Diffie-Hellman key exchange. Other key exchanges could be used of course as well in this process and this disclosure is not limited to the Diffie-Hellman key exchange.

Figure 4B:
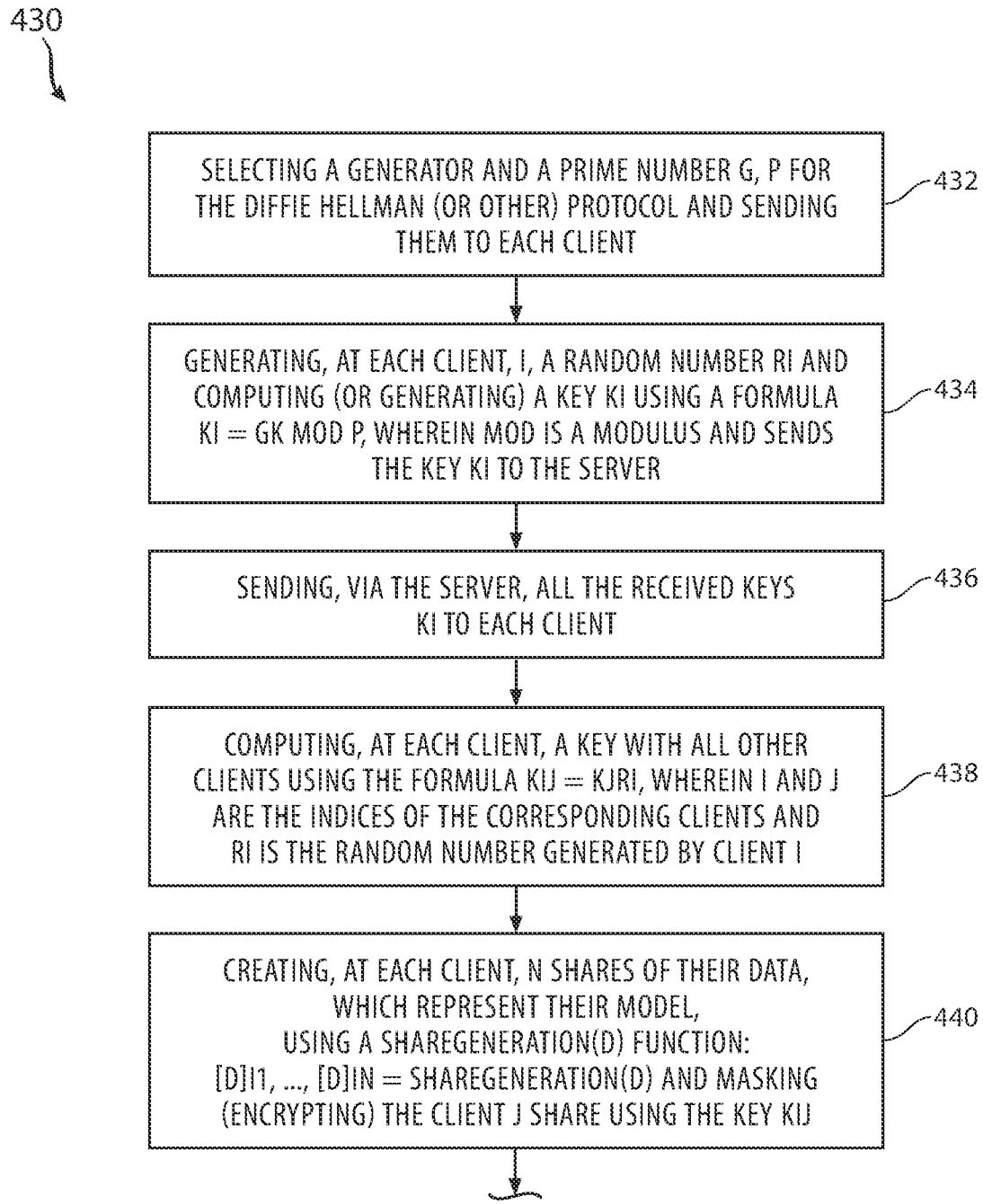
Figure 4B:
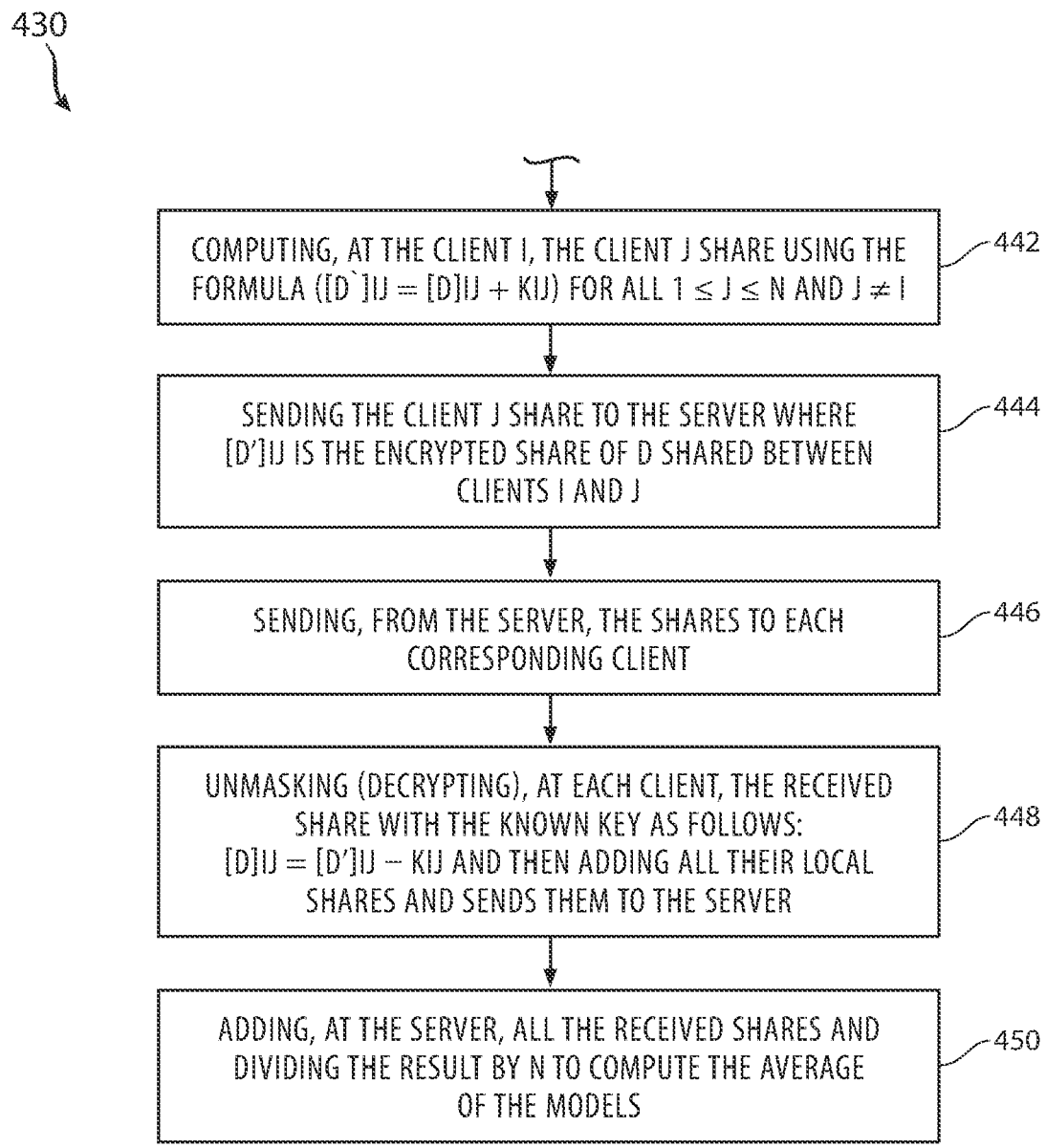

Next, the disclosure explains the approach for how n clients 102 and one server 104 can securely average a set of models d. The approach is shown as FIG. 4B. The method 430 includes the server 104 selecting a generator and a prime number g, p for the Diffie Hellman (or other) protocol and sending them to each client 102 (432). In this case, g is a public base prime number and p is a public prime modulus and both can be selected by the server 104. Each client, i, generates a random number $r_i$ and computes (or generates) a key $k_i$ using a formula $k_i = g^k$ mod p, wherein mod is a modulus and sends the key $k_i$ to the server 104 (434). The server 104 sends all the received keys $k_i$ to each client 102 (436). Each client computes a key with all other clients. For example, client i computes a key with client j using the formula $k_{ij} = k_j^{r_i}$, wherein i and j are the indices of the corresponding clients and $r_i$ is the random number generated by client i (438). Each client creates n shares of their data, which represent their model in this example, using a Share-Generation (d) function: $[d]_{i1}, \ldots, [d]_{in}$ =ShareGeneration (d) and masks (encrypts) the client j share using the key $k_{ij}$ (440). Client i computes client j share using the formula ($[d']_{ij} = [d]_{ij} + kij$) for all $1 \leq j \leq n$ and $j \neq i$ (442) and then sends them to the server 104 where $[d]_{ij}$ is the encrypted share of d shared between clients i and j (442). The server sends the shares to each corresponding client (446). Each client unmasks (decrypts) the received share with the known key as follows: $[d]_{ij} = [d']_{ij} - k_{ij}$ and then adds all their local shares and sends them to the server 104 (448). Finally, the server 104 adds all the received shares and divides the result by n to compute the average of the models (450). Note that this method covers operations from both the server 104 and one or more client 102. The method can be modified to only recite operations by the server 104 or only operations by a respective client of the clients 102. Note also that although the steps of the SMPC process can be performed as part of the overall larger process of averaging the loss function, the process can also be separately claimed assuming primarily that there are two assets (data, models, algorithms, etc.) that need to be kept private but that might need to be averaged or combined in some way. In other words, the SMPC process can be a stand-alone process independent of other processes disclosed herein.

Figure 5:
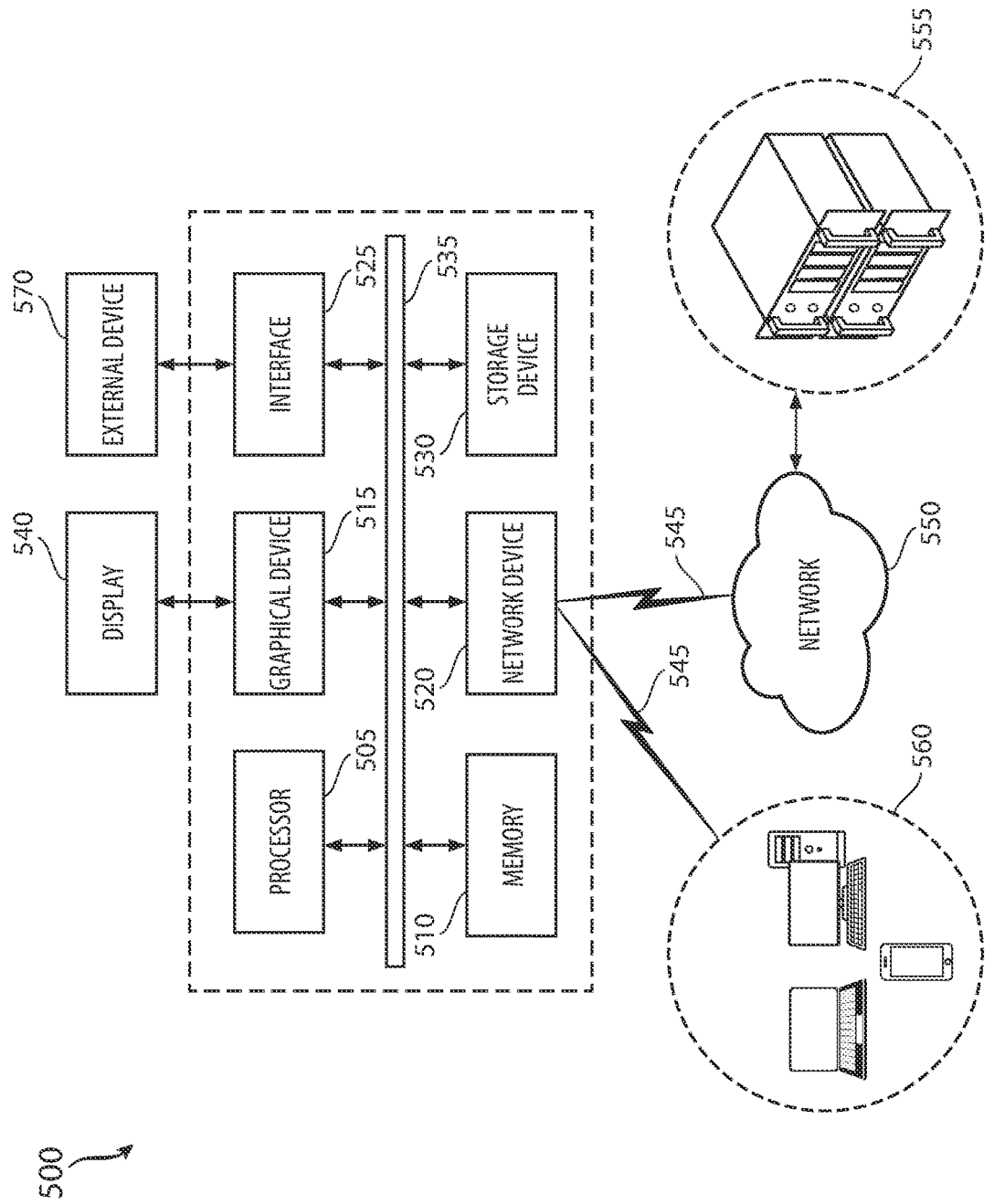
FIG. 5 illustrates an example system or device according to some aspects of this disclosure.

FIG. 5 illustrates an example computer system 500 for implementing a part of the instant disclosure. For example, the example computer system 500 may execute a client application for performing the instant disclosure.

The example computer system 500 includes a processor 505, a memory 510, a graphical device 515, a network device 520, interface 525, and a storage device 530 that are connected to operate via a bus 535. The processor 505 reads causes machine instructions (e.g., reduced instruction set (RISC), complex instruction set (CISC), etc.) that are loaded into the memory 510 via a bootstrapping process and executes an operating system (OS) for executing application within frameworks provided by the OS. For example, the processor 505 may execute an application that executes an application provided by a graphical framework such as Winforms, Windows Presentation Foundation (WPF), Windows User Interface (WinUI), or a cross platform user interface such as Xamarin or QT. In other examples, the processor 505 may execute an application that is written for a sandbox environment such as a web browser.

The processor 505 controls the memory 510 to store instructions, user data, operating system content, and other content that cannot be stored within the processor 505 internally (e.g., within the various caches). The processor 505 may also control a graphical device 515 (e.g., a graphical processor) that outputs graphical content to a display 540. In some example, the graphical device 515 may be integral within the processor 505. In yet another example, the display 540 may be integral with the computer system 500 (e.g., a laptop, a tablet, a phone, etc.). The memory can be a non-transitory memory in that it is not the air interface that can "store" electromagnetic signals but would be a man-made storage device such as random access memory (RAM), read-only memory (ROM), a hard drive, or some other hardware, physical memory component. Such a memory or combination of different memory components can store computer instructions which cause the processor to perform various operations as described herein.

The graphical device 515 may be optimized to perform floating point operations such as graphical computations, and may be configured to execute other operations in place of the processor 505. For example, controlled by instructions to perform mathematical operations optimized for floating point math. For example, the processor 505 may allocate instructions to the graphical device 515 for operations that are optimized for the graphical device 515. For instance, the graphical device 515 may execute operations related to artificial intelligence (AI), natural language processing (NLP), vector math. The results may be returned to the processor 505. In another example, the application executing in the processor 505 may provide instructions to cause the processor 505 to request the graphical device 515 to perform the operations. In other examples, the graphical device 515 may return the processing results to another computer system (i.e, distributed computing).

The processor 505 may also control a network device 520 for transmits and receives data using a plurality of wireless channels 545 and at least one communication standard (e.g., Wi-Fi (i.e., 802.11ax, 802.11e, etc.), Bluetooth®, various standards provided by the 3rd Generation Partnership Project (e.g., 3G, 4G, 5G), or a satellite communication network (e.g., Starlink). The network device 520 may wirelessly connect to a network 550 to connect to servers 555 or other service providers. The network device 520 may also be connected to the network 550 via a physical (i.e., circuit) connection. The network device 520 may also directly connect to local electronic device 560 using a point-to-point (P2P) or a short range radio connection.

The processor 505 may also control an interface 525 that connects with an external device 570 for bidirectional or unidirectional communication. The interface 525 is any suitable interface that forms a circuit connection and can be implemented by any suitable interface (e.g., universal serial bus (USB), Thunderbolt, and so forth). The external device 565 is able to receive data from the interface 525 to process the data or perform functions for different applications executing in the processor 505. For example, the external device 565 may be another display device, a musical instrument, a computer interface device (e.g., a keyboard, a mouse, etc.), an audio device (e.g., an analog-to-digital converter (ADC), a digital-to-analog converter (DAC)), a storage device for storing content, an authentication device, an external network interface (e.g., a 5G hotspot), a printer, and so forth.

It is noted that in one aspect, the steps disclosed herein can be practiced by a "system." The system can include the server and one or more clients together, or might just be functionality performed by the server. The system could also be a client or a group of clients, such as clients in a particular geographic area or clients groups in some manner that are performing the client-based functions disclosed herein. Claims can be included which outline the steps that occur from the standpoint of any device disclosed herein. For example, the steps of transmission, calculation, and receiving of data can be claimed from the standpoint of a server device, a client device, or group of client devices depending on which embodiment is being covered. All such communication from the standpoint of an individual component or device can be included as within the scope of a particular embodiment focusing on that device.

In another aspect, the system can include a platform as disclosed in the patent applications incorporated by reference also performing steps in coordination with the concept disclosed above. Therefore, the platform as used to provide the federated-split learning process described herein is also an embodiment of this disclosure and steps can be recited in connection with the use of that platform for training models in a manner that maintains privacy of the data as described herein.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

STATEMENT BANK

Statement 1. A method comprising:
training, at a client system of a plurality of client systems, a part of a deep learning network up to a split layer of the client system;
based on an output of the split layer of the client system, completing, at a server system, training of the deep learning network by asynchronously forward propagating the output received at a split layer of the server system to a last layer of the server system;
calculating a weighted loss function for the client system at the last layer of the server system to yield a calculated loss function for the client system;
storing the calculated loss function for the client system in a queue;
after each respective client system of the plurality of client systems has a respective loss function stored in the queue to yield a plurality of respective weighted client loss functions, averaging, at the server system, the plurality of respective weighted client loss functions to yield an average loss value;
back propagating gradients based on the average loss value from the last layer of the server system to the split layer of the server system to yield server system split layer gradients; and
transmitting just the server system split layer gradients to the plurality of client systems, wherein no weights are shared across different client systems of the plurality of client systems.

Statement 2. The method of Statement 1, wherein the weighted loss function comprises a minimizing of a statistical distance between (1) a distribution of activations communicated by the client system to the server system from just the split layer of the client system and (2) a classification loss.

Statement 3. The method of any preceding Statement, wherein the classification loss comprises a categorical cross-entropy or a cross-entropy.

Statement 4. The method of any preceding Statement, wherein storing the calculated loss function for the client system in the queue further comprises storing respective calculated loss function for each respective client system of the plurality of client systems.

Statement 5. The method of any preceding Statement, wherein storing respective calculated loss function for each respective client system of the plurality of client systems is performed asynchronously on a first-come-first-stored manner.

Statement 6. The method of any preceding Statement, wherein transmitting just the server system split layer gradients to the plurality of client systems further comprises transmitting just the server system split layer gradients to each client system of the plurality of client systems.

Statement 7. The method of any preceding Statement, further comprising:
back propagating, at the client system and from the split layer of the client system to an input layer of the client system, the server system split layer gradients to complete a training epoch of the deep learning network.

Statement 8. A system comprising:
a storage configured to store instructions;
one or more processors configured to execute the instructions and cause the one or more processors to:
train, at a client system of a plurality of client systems, a part of a deep learning network up to a split layer of the client system;

based on an output of the split layer of the client system, complete, at a server system, training of the deep learning network by asynchronously forward propagate the output received at a split layer of the server system to a last layer of the server system;

calculate a weighted loss function for the client system at the last layer of the server system to yield a calculated loss function for the client system;

store the calculated loss function for the client system in a queue;

after each respective client system of the plurality of client systems has a respective loss function stored in the queue to yield a plurality of respective weighted client loss functions, average, at the server system, the plurality of respective weighted client loss functions to yield an average loss value;

back propagate gradients based on the average loss value from the last layer of the server system to the split layer of the server system to yield server system split layer gradients; and transmit just the server system split layer gradients to the plurality of client systems, wherein no weights are shared across different client systems of the plurality of client systems.

Statement 9. The system of Statement 8, wherein the weighted loss function comprises a minimizing of a statistical distance between (1) a distribution of activations communicated by the client system to the server system from just the split layer of the client system and (2) a classification loss.

Statement 10. The system of any preceding Statement, wherein the classification loss comprises a categorical cross-entropy or a cross-entropy.

Statement 11. The system of claim 8, wherein storing the calculated loss function for the client system in the queue further comprises storing respective calculated loss function for each respective client system of the plurality of client systems.

Statement 12. The system of any preceding Statement, wherein storing respective calculated loss function for each respective client system of the plurality of client systems is performed asynchronously on a first-come-first-stored manner.

Statement 13. The system of any preceding Statement, wherein transmitting just the server system split layer gradients to the client system further comprises transmitting just the server system split layer gradients to each client system of the plurality of client systems.

Statement 14. The system of any preceding Statement, further comprising:

back propagate, at the client system and from the split layer of the client system to an input layer of the client system, the server system split layer gradients to complete a training epoch of the deep learning network.

Statement 15. A non-transitory computer readable medium comprising instructions, the instructions, when executed by a computing system, cause the computing system to:

train, at a client system of a plurality of client systems, a part of a deep learning network up to a split layer of the client system;

based on an output of the split layer of the client system, complete, at a server system, training of the deep learning network by asynchronously forward propagate the output received at a split layer of the server system to a last layer of the server system;

calculate a weighted loss function for the client system at the last layer of the server system to yield a calculated loss function for the client system;

store the calculated loss function for the client system in a queue;

after each respective client system of the plurality of client systems has a respective loss function stored in the queue to yield a plurality of respective weighted client loss functions, average, at the server system, the plurality of respective weighted client loss functions to yield an average loss value;

back propagate gradients based on the average loss value from the last layer of the server system to the split layer of the server system to yield server system split layer gradients; and transmit just the server system split layer gradients to the plurality of client systems, wherein no weights are shared across different client systems of the plurality of client systems.

Statement 16. The computer readable medium of Statement 15, wherein the weighted loss function comprises a minimizing of a statistical distance between (1) a distribution of activations communicated by the client system to the server system from just the split layer of the client system and (2) a classification loss.

Statement 17. The computer readable medium of any preceding Statement, wherein the classification loss comprises a categorical cross-entropy or a cross-entropy.

Statement 18. The computer readable medium of any preceding Statement, wherein storing the calculated loss function for the client system in the queue further comprises storing respective calculated loss function for each respective client system of the plurality of client systems.

Statement 19. The computer readable medium of any preceding Statement, wherein storing respective calculated loss function for each respective client system of the plurality of client systems is performed asynchronously on a first-come-first-stored manner.

Statement 20. The computer readable medium of any preceding Statement, wherein transmitting just the server system split layer gradients to the client system further comprises transmitting just the server system split layer gradients to each client system of the plurality of client systems.

Statement 21. A method comprising:

receiving a first model from a first client and a second model from a second client;

generating an average of the first model and the second model to yield an average model; and providing the average model to each of the first client and the second client as an updated model.

Statement 22. The method of any preceding Statement, further comprising:

receiving the first model and the second model in an encrypted state.

Statement 23. The method of any preceding Statement, wherein the first model from the first client and the second model from the second client each are encrypted and have at least a portion of its data being rubbish data.

Statement 23. The method of any preceding Statement, wherein the first model from the first client and the second model from the second client each represent a respective portion of all the available data associated with the first model from the first client and the second model.

Statement 24. The method of any preceding Statement, wherein receiving a first model from a first client and a second model from a second client occurs after an epoch in which all batches of data for the first client and the second client are processed by respectively by each of the first client, the second client, and a server-side model to generate gradients received at the first client and the second client to update their respective models to yield the first model and the second model.

Statement 21. A system comprising:
a processor; and
a computer-readable storage device storing instructions which, when executed by the processor, cause the processor to perform operations comprising:
receiving a first model from a first client and a second model from a second client;
generating an average of the first model and the second model to yield an average model; and
providing the average model to each of the first client and the second client as an updated model.

Statement 22. The system of any preceding Statement, further comprising:
receiving the first model and the second model in an encrypted state.

Statement 23. The system of any preceding Statement, wherein the first model from the first client and the second model from the second client each are encrypted and have at least a portion of its data being rubbish data.

Statement 23. The system of any preceding Statement, wherein the first model from the first client and the second model from the second client each represent a respective portion of all the available data associated with the first model from the first client and the second model.

Statement 24. The system of any preceding Statement, wherein receiving a first model from a first client and a second model from a second client occurs after an epoch in which all batches of data for the first client and the second client are processed by respectively by each of the first client, the second client, and a server-side model to generate gradients received at the first client and the second client to update their respective models to yield the first model and the second model.

Statement 25. A method comprising:
transmitting smashed data, generated from a client-side model, to a server for training a server-side model and to generate gradients based on the smashed data;
receiving the gradients back from the server;
updating the client-side model based on the gradients received from the server to yield an updated client-side model;
sending the updated client-side model to an averaging component which generates in a weighted average client-side model; and
receiving the weighted average client-side model from the averaging component.

Statement 26. The method of Statement 25, wherein the updated client-side model is encrypted or modified such that not all of the updated client-side model data is sent to the averaging component.

Statement 27. The method of any preceding Statement, wherein the updated client-side model includes some rubbish data and/or does not include all of the available data of the updated client-side model.

Statement 27. The method of any preceding Statement, wherein the weighted average client-side model is generated from at least one other updated client-side model from a different client.

Statement 28. The method of any preceding Statement, wherein the gradients generated by the server include an averaged loss function from loss values of a plurality of clients.

Statement 28. A system comprising:
a processor; and
a computer-readable storage device storing instructions which, when executed by the processor, cause the processor to perform operations comprising:
transmitting smashed data, generated from a client-side model, to a server for training a server-side model and to generate gradients based on the smashed data;
receiving the gradients back from the server;
updating the client-side model based on the gradients received from the server to yield an updated client-side model;
sending the updated client-side model to an averaging component which generates in a weighted average client-side model; and
receiving the weighted average client-side model from the averaging component.

Statement 29. The system of Statement 28, wherein the updated client-side model is encrypted or modified such that not all of the updated client-side model data is sent to the averaging component.

Statement 30. The method of any preceding Statement, wherein the updated client-side model includes some rubbish data and/or does not include all of the available data of the updated client-side model.

Statement 31. The method of any preceding Statement, wherein the weighted average client-side model is generated from at least one other updated client-side model from a different client.

Statement 32. The method of any preceding Statement, wherein the gradients generated by the server include an averaged loss function from loss values of a plurality of clients.

Statement 33. A method comprising:
receiving, at a server system and from a client system of a plurality of client systems, smashed data associated with the client system;
completing, at the server system, training of a deep learning network by asynchronously forward propagating the smashed data received at a split layer of the server system to a last layer of the server system;
calculating a weighted loss function for the client system at the last layer of the server system to yield a calculated loss function for the client system;
storing the calculated loss function for the client system in a queue;
after each respective client system of the plurality of client systems has a respective loss function stored in the queue to yield a plurality of respective weighted client loss functions, averaging, at the server system, the plurality of respective weighted client loss functions to yield an average loss value;
back propagating gradients, based on the average loss value, from the last layer of the server system to the split layer of the server system to yield server system split layer gradients; and
transmitting, from the server system, split layer gradients to the plurality of client systems, wherein no weights are shared across different client systems of the plurality of client systems.

Statement 35. The method of Statement 35, wherein the weighted loss function comprises a minimizing of a statistical distance between (1) a distribution of activations communicated by the client system to the server system from just the split layer of the client system and (2) a classification loss.

Statement 36. The method of any preceding Statement, wherein the classification loss comprises a categorical cross-entropy or a cross-entropy.

Statement 37. The method of any preceding Statement, wherein storing the calculated loss function for the client system in the queue further comprises storing respective calculated loss function for each respective client system of the plurality of client systems.

Statement 38. The method of any preceding Statement, wherein storing respective calculated loss function for each respective client system of the plurality of client systems is performed asynchronously on a first-come-first-stored manner.

Statement 39. The method of any preceding Statement, wherein transmitting just the server system split layer gradients to the plurality of client systems further comprises transmitting just the server system split layer gradients to each client system of the plurality of client systems.

Statement 40. The method of any preceding Statement, further comprising:
back propagating, at the client system and from the split layer of the client system to an input layer of the client system, the server system split layer gradients to complete a training epoch of the deep learning network.

Statement 41. A method comprising:
transmitting, to a server system and from a client system of a plurality of client systems, smashed data associated with the client system, wherein the server system completes training of a deep learning network by asynchronously forward propagating the smashed data received at a split layer of the server system to a last layer of the server system, calculates a weighted loss function for the client system at the last layer of the server system to yield a calculated loss function for the client system, stores the calculated loss function for the client system in a queue, after each respective client system of the plurality of client systems has a respective loss function stored in the queue to yield a plurality of respective weighted client loss functions, averages, at the server system, the plurality of respective weighted client loss functions to yield an average loss value and back propagating gradients based on the average loss value from the last layer of the server system to the split layer of the server system to yield server system split layer gradients; and
receiving, from the server system and at the plurality of client systems, split layer gradients associated with the average loss value, wherein no weights are shared across different client systems of the plurality of client systems.

Statement 42. The method of Statement 41, wherein the weighted loss function comprises a minimizing of a statistical distance between (1) a distribution of activations communicated by the client system to the server system from just the split layer of the client system and (2) a classification loss.

Statement 43. The method of any preceding Statement, wherein the classification loss comprises a categorical cross-entropy or a cross-entropy.

Statement 44. The method of any preceding Statement, wherein storing the calculated loss function for the client system in the queue further comprises storing respective calculated loss function for each respective client system of the plurality of client systems.

Statement 45. The method of any preceding Statement, wherein storing respective calculated loss function for each respective client system of the plurality of client systems is performed asynchronously on a first-come-first-stored manner.

Statement 46. The method of any preceding Statement, wherein transmitting just the server system split layer gradients to the plurality of client systems further comprises transmitting just the server system split layer gradients to each client system of the plurality of client systems.

Statement 47. The method of any preceding Statement, further comprising:
back propagating, at the client system and from the split layer of the client system to an input layer of the client system, the server system split layer gradients to complete a training epoch of the deep learning network.

Statement 48. A method comprising:
selecting, at a server, a generator and a prime number g, p for a protocol and sending them to each client, wherein g is a public base prime number and p is a public prime modulus;
generating, at each client, i, a random number $r_i$ and computing a key $k_i$ using a formula $k_i = g^k$ mod p, wherein mod is a modulus and sending, from each client i, the key $k_i$ to the server to yield received keys $k_i$;
sending all the received keys $k_i$ to each client;
computing, at each client i with another client j, a key with all other clients using a formula $k_{ij} = k_j^{ri}$, wherein i and j are the indices of the corresponding clients and $r_i$ is a random number generated by client i;
creating n shares of data for each client i using a Share-Generation (d) function: $[d]_{i1}, \ldots, [d]_{in}$=ShareGeneration (d) and masking the client j share using the key $k_{ij}$;
computing, for each client i, a client j share using a formula $([d']_{ij} = [d]_{ij} + k_{ij})$ for all $1 \leq j \leq n$ and $j \neq i$;
sending, from the client i, the client j share to the server where $[d']_{ij}$ is the encrypted share of d shared between clients i and j;
sending the shares to each corresponding client;
unmasking, at each client, the received share with the known key as follows: $[d]_{ij} = [d']_{ij} - k_{ij}$;
adding, at each client, all their local shares and sending them to the server; and
adding, at the server, all the received shares and dividing the result by n to compute the average of the data, which can be models or the average of the models as described herein.

Statement 49. A system performing any of the methods of any preceding Statement.

What is claimed is:
1. A method comprising:
training, at a client system of a plurality of client systems, a part of a deep learning network up to a split layer of the client system;
based on an output of the split layer of the client system, completing, at a server system, training of the deep learning network;
calculating a weighted loss function for the client system at a last layer of the server system to yield a calculated loss function for the client system;
after each respective client system of the plurality of client systems has a respective loss function to yield a plurality of respective weighted client loss functions, averaging, at the server system, the plurality of respective weighted client loss functions to yield an average loss value;
back propagating gradients based on the average loss value from the last layer of the server system to a split layer of the server system to yield server system split layer gradients;
transmitting just the server system split layer gradients to the plurality of client systems, wherein no weights are shared across different client systems of the plurality of client systems;
back propagating, at the client system and from the split layer of the client system to an input layer of the client system, the server system split layer gradients to complete a training epoch of the deep learning network to yield a first model of a first client system of the plurality of client systems and a second model of a second client system of the plurality of client systems;
selecting, at the server system, a generator number g and a prime number p for a protocol and sending the generator number g and the prime number p to each client system i of the plurality of client systems, wherein a value of i identifies a respective client system of the plurality of client systems;
generating, at each client system i of the plurality of client systems, a random number ri and computing a key ki and sending, from each client system i of the plurality of client systems, the key ki to the server system to yield received keys ki;
sending all the received keys ki to each client system i of the plurality of client systems;
computing, at each client system i of the plurality of client systems with another client system j, a key Kij with all other clients, wherein a value of j identifies a different client system of the plurality of client systems from each client system i;
creating n shares of data for each client system i using a ShareGeneration (d) function: $[d]_{i1}, \ldots, [d]_{in}$=ShareGeneration (d) and masking a client system j share associated with the other client system j using the key kij, where n represent number of shares created;
computing, for each client system i of the plurality of client systems, the client system j share associated with the other client system j;
sending, from the client system i of the plurality of client systems, the client system j share to the server system where [d'ij is an encrypted share of d shared between client systems i and j;
sending the n shares to each corresponding client system of each client system i of the plurality of client systems;
unmasking, at each client system i of the plurality of client systems, a received share with the key kij;
adding, at each client system i of the plurality of client systems, all respective local shares and sending the respective local shares to the server system;
adding, at the server system, all received respective local shares from each client system i of the plurality of client systems to yield a result, and dividing the result by n to yield the average model, wherein n is a numeric value; and
distributing the average model to both the first client system and the second client system.

2. The method of claim 1, wherein the weighted loss function comprises a minimizing of a statistical distance between (1) a distribution of activations communicated by the client system to the server system from just the split layer of the client system and (2) a classification loss.

3. The method of claim 2, wherein the classification loss comprises a categorical cross-entropy or a cross-entropy.

4. The method of claim 1, further comprising:
storing respective calculated loss function in a queue for each respective client system i of the plurality of client systems.

5. The method of claim 4, wherein storing respective calculated loss function for each respective client system i of the plurality of client systems is performed asynchronously on a first-come-first-stored manner.

6. The method of claim 1, wherein transmitting just the server system split layer gradients to the plurality of client systems further comprises transmitting just the server system split layer gradients to each client system i of the plurality of client systems.

7. The method of claim 1, wherein one or more of the following apply: the generator number g is a public base prime number and the prime number p is a public prime modulus;
generating, at each client system i of the plurality of client systems, the random number ri and computing the key ki is performed using a formula $k=g^k \mod p$, wherein mod is a modulus;
computing, for each client system i of the plurality of client systems, the client system j share is performed using a formula [d]ij+kij) for all $1 \leq j \leq n$ and $j \neq i$;
computing, at each client system i of the plurality of client systems with the other client system j, the key Kij with all other clients is performed using a formula kij=kji, wherein i and j are indices of the corresponding client systems and ri is a random number generated by client system i; and unmasking, at each client system I of the plurality of client systems, the received share with the key kij is performed as follows: [d]i=[d']ij−kij.

8. The method of claim 1, wherein completing, at the server system, the training of the deep learning network is performed by asynchronously forward propagating the output received at the split layer of the server system to the last layer of the server system.

9. The method of claim 1, wherein generating the average model is performed using secure multi-party computation.

10. The method of claim 1, further comprising:
storing the calculated loss function for the client system in a queue.

11. A system comprising:
one or more hardware processors; and a non-transitory computer-readable storage device configured to store instructions which, when executed by the one or more hardware processors, cause the one or more hardware processors to perform operations comprising:
based on an output received from a split layer of a client system, completing, at the system, training of a deep learning network, wherein the client system is one of a plurality of client systems and a part of the deep learning network up to the split layer of the client system is trained at the client system;
calculating a weighted loss function for the client system at a last layer of the system to yield a calculated loss function for the client system;
after each respective client system of the plurality of client systems has a respective loss function to yield a plurality of respective weighted client loss functions, averaging the plurality of respective weighted client loss functions to yield an average loss value;
back propagating gradients based on the average loss value from the last layer of the system to a split layer of the system to yield system split layer gradients;

transmitting just the system split layer gradients to the plurality of client systems, wherein no weights are shared across different client systems of the plurality of client systems, wherein the client system back propagates from the split layer of the client system to an input layer of the client system, the system split layer gradients to complete a training epoch of the deep learning network to yield a first model of a first client system of the plurality of client systems and a second model of a second client system of the plurality of client systems;

selecting a generator number g and a prime number p for a protocol and sending the generator number g and the prime number p to each client system i of the plurality of client systems, wherein a value of i identifies a respective client system of the plurality of client system sand and wherein each client system i of the plurality of client systems generates a random number ri and computing a key ki; receiving, from each client system i of the plurality of client systems, the key ki to yield received keys ki;

transmitting, from the system, all the received keys ki to each client system i of the plurality of client systems, wherein each client system i:

computes a key kij with another client system j and with all other clients, wherein a value of j identifies a different client system of the plurality of client systems from a client system i;

creates n shares of data for each client system i using a ShareGeneration (d) function: $[d]_{i1}$, . . . , [d]in=ShareGeneration (d) and masks a client system j share associated with the other client system j using the key kij, wherein n is a number of shares created;

computes for each client system i of the plurality of client systems, the client system j share associated with the other client system j;

and sends, from the client system i of the plurality of client systems, the client system j share to the system where [d']ij is an encrypted share of d shared between client systems i and j;

sending, from the system, the n shares to each corresponding client system, wherein each client system i of the plurality of client systems unmasks a received share with the key kij, adds all respective local shares and sends the respective local shares to the system;

adding, at the system, all received respective local shares from each client system i of the plurality of client systems to yield a result, and dividing the result by n to yield the average model, wherein n is numeric value;

and distributing the average model to both the first client system and the second client system.

12. The system of claim 11, wherein the weighted loss function comprises a minimizing of a statistical distance between (1) a distribution of activations communicated by the client system to the server system from just the split layer of the client system and (2) a classification loss.

13. The system of claim 12, wherein the classification loss comprises a categorical cross-entropy or a cross-entropy.

14. The system of claim 11, wherein the non-transitory computer-readable storage device configured stores further instructions which, when executed by the one or more hardware processors, cause the one or more hardware processors to perform operations comprising:

storing respective calculated loss function in a queue for each respective client system of the plurality of client systems.

15. The system of claim 14, wherein storing respective calculated loss function for each respective client system i of the plurality of client systems is performed asynchronously on a first-come-first-stored manner.

16. The system of claim 11, wherein transmitting just the system split layer gradients to the client system further comprises transmitting just the system split layer gradients to each client system i of the plurality of client systems.

17. The system of claim 11, wherein completing, at the system, the training of the deep learning network is performed by asynchronously forward propagating the output received at the split layer of the system to a last layer of the system.

18. The system of claim 11, wherein generating the average model is performed using secure multi-party computation.

19. The system of claim 11, wherein one or more of the following apply: the generator number g is a public base prime number and the prime number p is a public prime modulus;

each client system i of the plurality of client systems generates the random number ri and computes the key ki using a formula $ki=g^k \mod p$, wherein mod is a modulus;

each client system i of the plurality of client systems computes the client system j share using a formula ([d']i= [d]i+kij) for all 1<j<n and j#i;

each client system i of the plurality of client systems computes with the other client system j, the key Kij with all other clients using a formula kij=ki, wherein i and j are indices of the corresponding client systems and ri is a random number generated by client system i of the plurality of client systems;

and each client system i of the plurality of client systems unmasks the received share with the key kij is performed as follows:

$$[d]_{ij}=[d']_{ij}-k_{ij}.$$

20. A method comprising:

based on an output received from a split layer of a client system, completing, at a server system, training of a deep learning network, wherein the client system is one of a plurality of client systems and a part of the deep learning network up to the split layer of the client system is trained at the client system;

calculating a weighted loss function for the client system at a last layer of the server system to yield a calculated loss function for the client system;

after each respective client system of the plurality of client systems has a respective loss function to yield a plurality of respective weighted client loss functions, averaging the plurality of respective weighted client loss functions to yield an average loss value;

back propagating gradients based on the average loss value from the last layer of the server system to a split layer of the server system to yield server system split layer gradients;

transmitting just the server system split layer gradients to the plurality of client systems, wherein no weights are shared across different client systems of the plurality of client systems, wherein the client system back propagates from the split layer of the client system to an input layer of the client system, the server system split layer gradients to complete a training epoch of the deep learning network to yield a first model of a first client system of the plurality of client systems and a second model of a second client system of the plurality of client systems;

selecting a generator number g and a prime number p for a protocol and sending the generator number g and the prime number p to each client system i of the plurality of client systems, wherein a value of i identifies a respective client system of the plurality of client systems, wherein each client system i generates a random number ri and computing a key ki;

receiving, from each client system i of the plurality of client systems, the key ki to yield received keys ki;

transmitting, from the server system, all the received keys ki to each client system i of the plurality of client systems, wherein each client system i:

computes a key Kij with another client system j and with all other clients;

creates n shares of data for each client system i using a ShareGeneration (d) function:

$[d]_{i1}, \ldots, [d]in$=ShareGeneration (d) and masks a client system j share associated with the other client system j using the key Kij, where n represent number of shares created;

computes for each client system i of the plurality of client systems, the client system j share associated with the other client system j;

and sends, from the client system i of the plurality of client systems, the client system j share to the server system where [d']ij is an encrypted share of d shared between client systems i and j;

sending, from the server system, the n shares to each corresponding client system, wherein each client system i of the plurality of client systems unmasks a received share with the key kij, adds all respective local shares and sends the respective local shares to the server system;

adding, at the server system, all received respective local shares from each client system i of the plurality of client systems to yield a result, and dividing the result by n to yield the average model, wherein n is a numeric value;

and distributing the average model to both the first client system and the second client system.

* * * * *